US011687654B2

(12) United States Patent
Sahita et al.

(10) Patent No.: US 11,687,654 B2
(45) Date of Patent: Jun. 27, 2023

(54) PROVIDING ISOLATION IN VIRTUALIZED SYSTEMS USING TRUST DOMAINS

(71) Applicant: Intel Corporation, Santa Clara, CA (US)

(72) Inventors: Ravi L. Sahita, Portland, OR (US); Baiju V. Patel, Portland, OR (US); Barry E. Huntley, Hillsboro, OR (US); Gilbert Neiger, Hillsboro, OR (US); Hormuzd M. Khosravi, Portland, OR (US); Ido Ouziel, Ein Carmel (IL); David M. Durham, Beaverton, OR (US); Ioannis T. Schoinas, Portland, OR (US); Siddhartha Chhabra, Portland, OR (US); Carlos V. Rozas, Portland, OR (US); Gideon Gerzon, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/705,562

(22) Filed: Sep. 15, 2017

(65) Prior Publication Data
US 2019/0087575 A1    Mar. 21, 2019

(51) Int. Cl.
*G06F 21/57* (2013.01)
*G06F 21/62* (2013.01)
(Continued)

(52) U.S. Cl.
CPC .......... *G06F 21/57* (2013.01); *G06F 12/1408* (2013.01); *G06F 21/53* (2013.01);
(Continued)

(58) Field of Classification Search
CPC ..... G06F 21/50–577; G06F 21/60–645; G06F 21/70–79; G06F 12/1408;
(Continued)

(56) References Cited

U.S. PATENT DOCUMENTS 5,495,614 A * 2/1996 Brent .................... G06F 13/102
719/328
10,255,202 B2   4/2019 Khosravi et al.
(Continued)

FOREIGN PATENT DOCUMENTS

CN    109145611 A    1/2019
CN    109643284 A    4/2019
(Continued)

OTHER PUBLICATIONS

Jin, Seongwook, et al. "Architectural support for secure virtualization under a vulnerable hypervisor." 2011 44th Annual IEEE/ACM International Symposium on Microarchitecture (MICRO). IEEE, 2011. (Year: 2011).*
(Continued)

*Primary Examiner* — Madhuri R Herzog
(74) *Attorney, Agent, or Firm* — Nicholson De Vos Webster & Elliott LLP

(57) ABSTRACT

Implementations describe providing isolation in virtualized systems using trust domains. In one implementation, a processing device includes a memory ownership table (MOT) that is access-controlled against software access. The processing device further includes a processing core to execute a trust domain resource manager (TDRM) to manage a trust domain (TD), maintain a trust domain control structure (TDCS) for managing global metadata for each TD, maintain an execution state of the TD in at least one trust domain thread control structure (TD-TCS) that is access-controlled against software accesses, and reference the MOT to obtain at least one key identifier (key ID) corresponding to an encryption key assigned to the TD, the key ID to allow the processing device to decrypt memory pages assigned to the TD responsive to the processing device
(Continued)

executing in the context of the TD, the memory pages assigned to the TD encrypted with the encryption key.

29 Claims, 16 Drawing Sheets

(51) Int. Cl.
*G06F 12/14* (2006.01)
*H04L 9/06* (2006.01)
*H04L 9/40* (2022.01)
*G06F 21/53* (2013.01)
*G06F 21/71* (2013.01)
*G06F 21/79* (2013.01)
*G06F 9/455* (2018.01)

(52) U.S. Cl.
CPC .......... *G06F 21/6218* (2013.01); *G06F 21/71* (2013.01); *G06F 21/79* (2013.01); *H04L 9/0618* (2013.01); *H04L 63/061* (2013.01); *G06F 9/45558* (2013.01); *G06F 2009/45587* (2013.01); *G06F 2212/1052* (2013.01); *G06F 2221/2107* (2013.01); *G06F 2221/2149* (2013.01)

(58) Field of Classification Search
CPC .......... G06F 9/455–45595; G06F 2009/45587; G06F 2212/1052; G06F 2221/2107; H04L 9/06–0668; H04L 63/06–068
See application file for complete search history.

(56) References Cited

U.S. PATENT DOCUMENTS

| | | | |
|---|---|---|---|
| 10,353,729 B1* | 7/2019 | Bell | G06F 8/60 |
| 10,404,674 B1* | 9/2019 | Bshara | H04L 9/0894 |
| 2008/0082772 A1* | 4/2008 | Savagaonkar | G06F 12/145 711/163 |
| 2010/0281273 A1 | 11/2010 | Lee et al. | |
| 2015/0058843 A1* | 2/2015 | Holler | G06F 9/455 718/1 |
| 2015/0261576 A1* | 9/2015 | Gong | G06F 12/109 711/6 |
| 2016/0078212 A1* | 3/2016 | Bish | G06F 21/53 713/189 |
| 2016/0132345 A1 | 5/2016 | Bacher et al. | |
| 2017/0132158 A1* | 5/2017 | Axnix | G06F 9/45558 |
| 2017/0277898 A1* | 9/2017 | Powell | G06F 21/602 |
| 2017/0300695 A1* | 10/2017 | He | H04L 9/40 |
| 2018/0095898 A1 | 4/2018 | Khosravi et al. | |
| 2018/0129611 A1* | 5/2018 | Parker | G06F 12/0284 |
| 2018/0150251 A1* | 5/2018 | Parker | G06F 12/1009 |
| 2018/0150413 A1* | 5/2018 | Parker | G06F 9/5016 |
| 2018/0165224 A1* | 6/2018 | Brown | G06F 21/57 |
| 2019/0004973 A1 | 1/2019 | Chhabra et al. | |
| 2019/0196983 A1 | 6/2019 | Khosravi et al. | |

FOREIGN PATENT DOCUMENTS

| | | |
|---|---|---|
| DE | 102018004290 A1 | 1/2019 |
| DE | 112017005008 T5 | 7/2019 |
| GB | 2539435 A | 12/2016 |
| JP | 2016-526730 A | 9/2016 |
| WO | 2016/203190 A1 | 12/2016 |
| WO | 2018063768 A1 | 4/2018 |

OTHER PUBLICATIONS

Jin, Seongwook, and Jaehyuk Huh. "Secure mmu: Architectural support for memory isolation among virtual machines." 2011 IEEE/IFIP 41st International Conference on Dependable Systems and Networks Workshops (DSN-W). IEEE, 2011. (Year: 2011).*
Szefer, Jakub, and Ruby B. Lee. "Architectural support for hypervisor-secure virtualization." ACM SIGPLAN Notices 47.4 (2012): 437-450. (Year: 2012).*
Extended European Search Report for European Patent Application No. 18189207.6 dated Jan. 14, 2019, 8 pages.
AMD: "AMD64 Technology, AMD64 Architecture, Programmer's Manual, vol. 2: System Programming", Advanced Micro Devices, Mar. 2017, Section 15, Appendix B, pp. 447-546 and 597-607, downloaded from URL:https://kib.kiev.ua/x86docs/AMD64/24593_APM_v2-r3.28.pdf on Dec. 14, 2018.
Kaplan, D., "Protecting VM Register State with SEV-ES", Advanced Micro Devices, Inc., white paper, Feb. 17, 2017, pp. 4-7, downloaded from URL:https://www.amd.com/system/files/techDocs/Protecting%20VM%20Register%20State%20with%20SEV-ES.pdf on Dec. 14, 2018.
Kaplan, D. et al., "AMD Memory Encryption," Advanced Micro Devices, Inc., white paper, Apr. 21, 2016, 12 pages, downloaded from URL:http://developer.amd.com/wordpress/media/2013/12/AMD_Memroy_Encryption_Whitepaper_v7-public.pdf on Dec. 14, 2018.
Extended European Search Report for European Patent Application No. 20152004.6 dated Feb. 12, 2020, 7 pages.
Intention to Grant, EP App. No. 18189207.6, dated Sep. 12, 2019, 7 pages.
Decision to Grant, EP App. No. 18189207.6, dated Jan. 30, 2020, 1 page.
Decision to Grant, EP App. No. 20152004.6, dated Apr. 30, 2021, 2 pages.
Communication under Rule 71(3) EPC, EP App. No. 20152004.6, dated Dec. 16, 2020, 7 pages.
European Search Report and Search Opinion, EP App. No. 21175141.7, dated Aug. 11, 2021, 8 pages.
Notice of Reasons for Refusal, JP App. No. 2018-121961, dated Mar. 29, 2022, 7 pages (4 pages of English Translation and 3 pages of Original Document).
Decision to Grant a Patent, JP App. No. 2018-121961, dated Jul. 5, 2022, 3 pages (2 pages of English translation and 1 page of Original Document).

* cited by examiner

┌─ 400

┌─────────────────────────────────────────────────────────────────────┐
│ Execute a trust domain resource manager (TDRM) to manage a trust domain │
│ (TD) comprising a virtual machine (VM), the TD executed by the processing │
│ device                                                              │
│                                                                 410 │
└─────────────────────────────────────────────────────────────────────┘
                                    ▼
┌─────────────────────────────────────────────────────────────────────┐
│ Maintain a trust domain control structure (TDCS) for managing global metadata │
│ of one or more of the TD or other TDs executed by the processing device │
│                                                                 420 │
└─────────────────────────────────────────────────────────────────────┘
                                    ▼
┌─────────────────────────────────────────────────────────────────────┐
│ Maintain an execution state of the TD in a trust domain thread control structure │
│ (TD-TCS) that is access-controlled against software accesses from at least one │
│ of the TDRM, a virtual machine manager (VMM), or the other TDs      │
│                                                                 430 │
└─────────────────────────────────────────────────────────────────────┘
                                    ▼
┌─────────────────────────────────────────────────────────────────────┐
│ Reference the MOT to obtain at least one key identifier (ID) corresponding to │
│ an encryption key assigned to the TD, the key ID to allow the processing │
│ device to access memory pages assigned to the TD responsive to the  │
│ processing device executing in the context of the TD, the memory pages │
│ assigned to the TD encrypted with the encryption key                │
│                                                                 440 │
└─────────────────────────────────────────────────────────────────────┘
                                    ▼
┌─────────────────────────────────────────────────────────────────────┐
│ Reference the MOT to obtain a guest physical address corresponding to a host │
│ physical memory page assigned to the TD, wherein a match of the guest │
│ physical address obtained from the MOT with an accessed guest physical │
│ address is to allow the processing device access to the memory pages │
│ assigned to the TD responsive to the processing device executing in the │
│ context of the TD                                                   │
│                                                                 450 │
└─────────────────────────────────────────────────────────────────────┘

```
┌─────────────────────────────────────────────────────────────────────────┐
│ Identify, by a processing device executing a trust domain resource manager │
│ (TDRM) to manage a trust domain (TD) executing on the processing device, a │
│                            TD exit event                                   │
│                                                                       510  │
└─────────────────────────────────────────────────────────────────────────┘
                                    │
                                    ▼
┌─────────────────────────────────────────────────────────────────────────┐
│ Responsive to identifying the TD exit event, utilize a first key identifier (ID) │
│   corresponding to a first encryption key assigned to the TD to save a TD │
│   supervisor execution state and a user execution state of the TD into a trust │
│ domain thread control structure (TDCS) corresponding to the TD, the execution │
│  state encrypted with the first encryption key, wherein the TD-TCS is access- │
│   controlled against software accesses from at least one of the TDRM, a VMM, │
│                 or other TDs executed by the processing device            │
│                                                                       520  │
└─────────────────────────────────────────────────────────────────────────┘
                                    │
                                    ▼
┌─────────────────────────────────────────────────────────────────────────┐
│ Modify a key ID state of the processing device from the first key ID to a second │
│                    key ID corresponding to the TDRM                        │
│                                                                       530  │
└─────────────────────────────────────────────────────────────────────────┘
                                    │
                                    ▼
┌─────────────────────────────────────────────────────────────────────────┐
│ Load a TDRM execution and control state and exit information for the TDRM to │
│       cause the processing device to operating in a context of the TDRM    │
│                                                                       540  │
└─────────────────────────────────────────────────────────────────────────┘
```

Identify a trust domain (TD) enter event while a processing device is executing in a context of a trust domain resource manager (TDRM), the TDRM to manage the TD

610

▼

Responsive to identifying the TD enter event, utilize a first key ID corresponding to a first encryption key to assigned to the TDRM to load a TDRM control state of the TDRM from a trust domain resource manager control structure (TDRCS) corresponding to the TDRM, the TDRM control state encrypted with the first encryption key

620

▼

Modify a key ID state of the processing device from the first key ID to a second key ID corresponding to a second encryption key assigned to the TD

630

▼

Load a TD user execution state and supervisory execution state of the TD from a TD-TCS to cause the processing device to operate in a context of the TD

PROVIDING ISOLATION IN VIRTUALIZED SYSTEMS USING TRUST DOMAINS

The disclosure pertains to computer systems; more specifically, to providing isolation in virtualized systems using trust domains.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing etc. to retrieve data from memory. This data from memory could include sensitive data for example, privacy-sensitive data, IP-sensitive data, and also keys used for file encryption or communication. The exposure of data is further exacerbated with the current trend of moving data and enterprise workloads into the cloud utilizing virtualization-based hosting services provided by cloud service providers.

BRIEF DESCRIPTION OF THE DRAWINGS

FIG. 4 is a flow diagram of an example method for providing isolation in virtualized systems using trust domains according to one implementation.

FIG. 5 is a flow diagram of an example method for performing a trust domain exit routine while providing isolation in virtualized systems using trust domains according to one implementation.

FIG. 6 is a flow diagram of an example method for performing a trust domain enter routine while providing isolation in virtualized systems using trust domains according to one implementation.

DETAILED DESCRIPTION

Figure 1A:
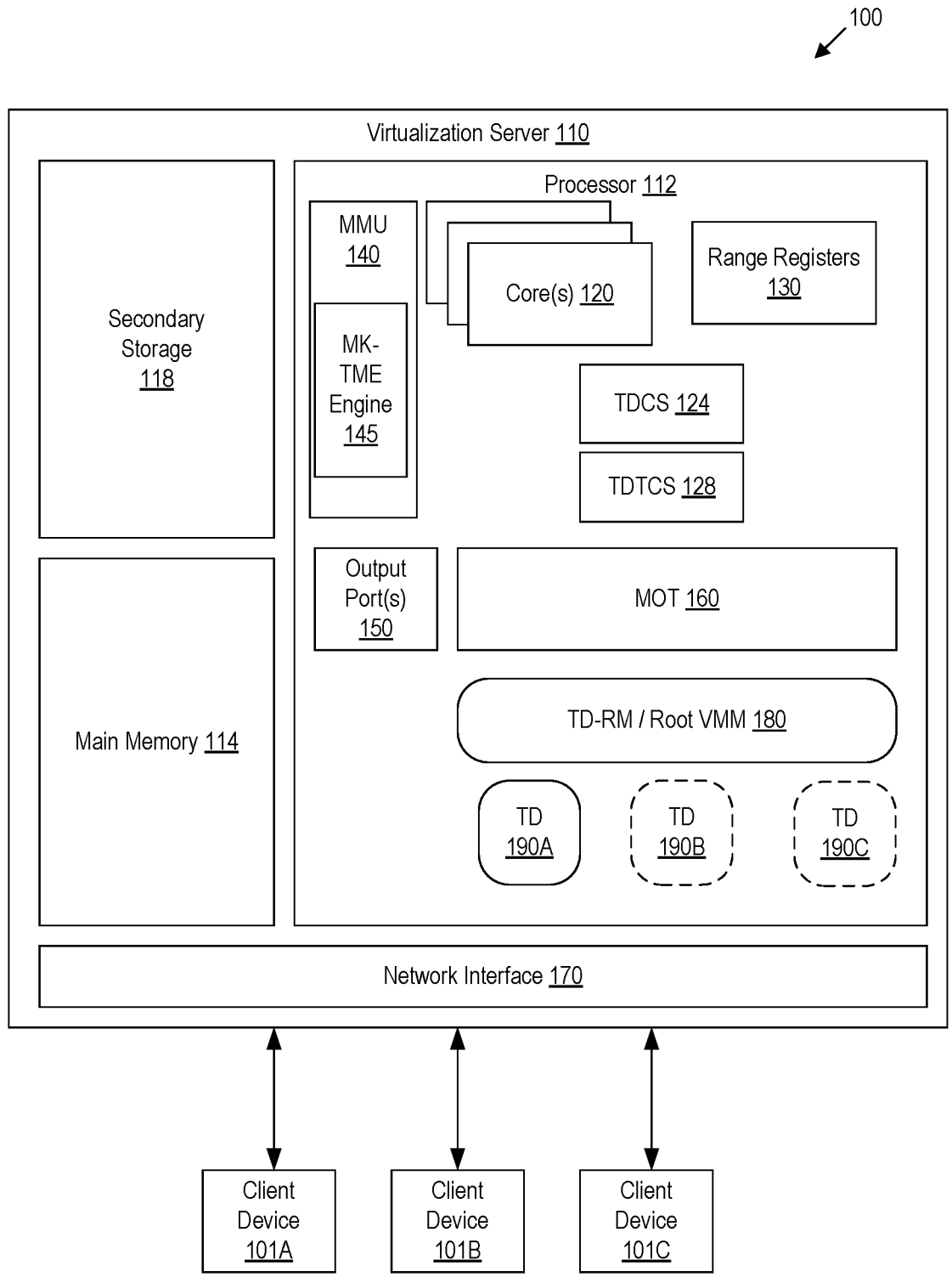
FIG. 1A is a block diagram illustrating an example computing system that provides isolation in virtualized systems using trust domains according to one implementation.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a Trusted Computing Base (TCB) of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MK-TME) engine, 2) a resource management capability referred to herein as the trust domain resource manager (TDRM); a TDRM may be a software extension of the Virtual Machine Monitor (VMM), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically isolated in memory using at least one exclusive encryption key of the MK-TME engine for encrypting the memory (holding code and/or data) associated with the trust domain.

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the CPUs per TD, and other integrity and replay controls on memory. Software executing in a TD operates with reduced privileges so that the TDRM can retain control of platform resources.

However the TDRM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset sub-systems that implementations of the disclosure avoid. The TD architecture of implementations of the disclosure provides isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random access memory (DRAM), or storage class memory (SCM)-based memory, such as Non-Volatile. Dual In-line Memory Module (NV-DIMM). As such, implementations of the disclosure allow software to take advantage of performance benefits, such as NVDIMM direct access storage (DAS) mode for SCM, without compromising platform security requirements.

FIG. 1A is a schematic block diagram of a computing system 100 that provides isolation in virtualized systems using TDs, according to an implementation of the disclosure. The virtualization system 100 includes a virtualization server 110 that supports a number of client devices 101A-101C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 101A-101C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD.

Figure 1B:
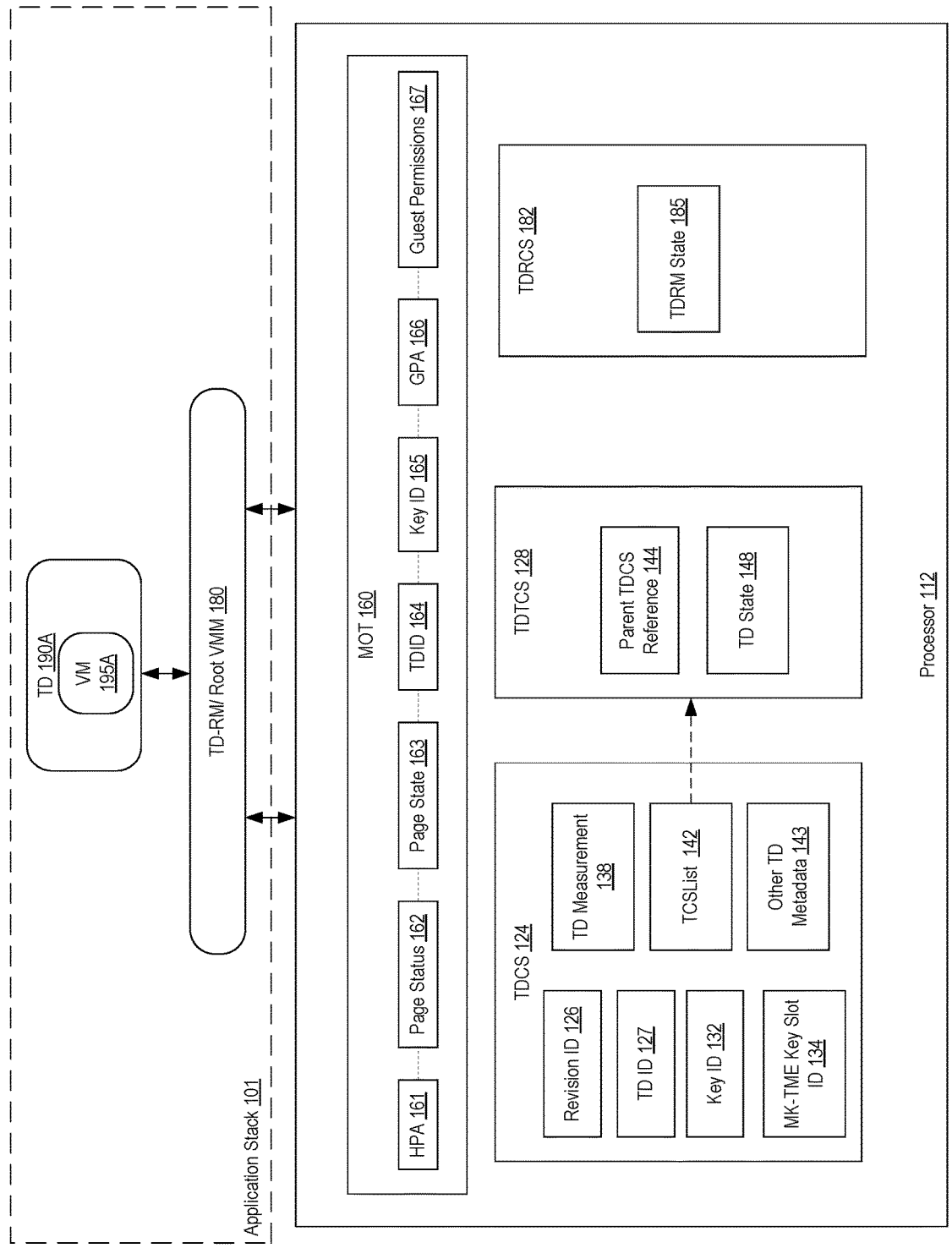
FIG. 1B is a block diagram illustrating another example computing system that provides isolation in virtualized systems using trust domains according to one implementation.

The processor 112 may include one or more cores 120 (also referred to as processing cores 120), range registers 130, a memory management unit (MMU) 140, and output port(s) 150. FIG. 1B is a schematic block diagram of a detailed view of a processor core 120 executing a TDRM 180 in communication with a MOT 160 and one or more trust domain control structure(s) (TDCS(s)) 124 and trust domain thread control structure(s) (TDTCS(s)) 128, as shown in FIG. 1A. TDTCS and TD-TCS may be used interchangeably herein. The processor 112 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another implementation, the processor 112 may be used in a SoC system.

The computing system 100 is representative of processing systems based on the PENTIUM III™, PENTIUM 4™, Xeon™, Itanium, XScale™ and/or StrongARM™ microprocessing devices available from Intel Corporation of Santa Clara, Calif., although other systems (including PCs having other microprocessing devices, engineering workstations, set-top boxes and the like) may also be used. In one implementation, sample system 100 executes a version of the WINDOWS™ operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by a MMU 140.

The core 120 may execute the MMU 140 to load pages from the secondary storage 118 into the main memory 114 (which includes a volatile memory and/or a non-volatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory, and provide parameters for a protocol that allows the core 120 to read, walk and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112). Components of the TD architecture can include 1) memory encryption via an MK-TME engine 145, 2) a resource management capability referred to herein as the TDRM 180, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TD workloads 190A-190C.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but is not privy to access the memory state of a TD 190A due to separate encryption keys, and other integrity and replay controls on memory.

With respect to the separate encryption keys, the processor may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MK-TME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software.

Each TD 190A-190C is a software environment that supports a software stack consisting of VMMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however the TDRM cannot affect the confidentiality or integrity of the TD 190A-190C under defined circumstances. Further details of the TD architecture and TDX are described in more detail below with reference to FIG. 1B.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) microprocessing device, a reduced instruction set computing (RISC) microprocessing device, a very long instruction word (VLIW) microprocessing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system I/O, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

With reference to FIG. 1B, this figures depicts a block diagram if the processor 112 of FIG. 1A, according to one implementation of the disclosure. In one implementation, the processor 112 may execute an application stack 101 via a single core 120 or across several cores 120. As discussed above, the processor 112 may provide a TD architecture and TDX to provide confidentiality (and integrity) for customer software running in the customer/tenants (i.e., TDs 190A) in an untrusted cloud service providers (CSP) infrastructure. The TD architecture provides for: memory isolation via a MOT 160; CPU state isolation that incorporates CPU key management via TDCS 124 and/or TDTCS 128; and CPU measurement infrastructure for TD 190A software.

In one implementation, TD architecture provides ISA extensions (referred to as TDX) that support confidential operation of OS and OS-managed applications (virtualized and non-virtualized). A platform, such as one including processor 112, with TDX enabled can function as multiple encrypted contexts referred to as TDs. For ease of explanation, a single TD 190A is depicted in FIG. 1B. Each TD 190A can run VMMs, VMs, OSes, and/or applications. For example. TD 190A is depicted as hosting VM 195A.

In one implementation, the TDRM 180 may include as part of VMM functionality (e.g., root VMM). A VMM may refer to software, firmware, or hardware to create, run, and manage a virtual machines (VM), such as VM 195A. It should be noted that the VMM may create, run, and manage one or more VMs. As depicted, the VMM 110 is included as a component of one or more processing cores 120 of a processing device 122. The VMM 110 may create and run the VM 195A and allocate one or more virtual processors (e.g., vCPUs) to the VM 195A. The VM 195A may be referred to as guest 195A herein. The VMM may allow the VM 195A to access hardware of the underlying computing system, such as computing system 100 of FIG. 1A. The VM 195A may execute a guest operating system (OS). The VMM may manage the execution of the guest OS. The guest OS may function to control access of virtual processors of the VM 195A to underlying hardware and software resources of the computing system 100. It should be noted that, when there are numerous VMs 195A operating on the processing device 112, the VMM may manage each of the guest OSes executing on the numerous guests. In some implementations, a VMM may be implemented with the TD 190A to manage the VMs 195A. This VMM may be referred to as a tenant VMM and/or a non-root VMM, and is discussed in further detail below.

TDX also provides a programming interface for a TD management layer of the TD architecture referred to as the TDRM 180. A TDRM may be implemented as part of the CSP/root VMM. The TDRM 180 manages the operation of TDs 190A. While a TDRM 180 can assign and manage resources, such as CPU, memory and input/output (I/O) to TDs 190A, the TDRM 180 is designed to operate outside of a TCB of the TDs 190A. The TCB of a system refers to a set of hardware, firmware, and/or software component that have an ability to influence the trust for the overall operation of the system.

In one implementation, the TD architecture is thus a capability to protect software running in a TD 190A. As discussed above, components of the TD architecture may include 1) Memory encryption via a TME engine having Multi-key extensions to TME (e.g., MK-TME engine 145 of FIG. 1A), 2) a software resource management layer (TDRM 180), and 3) execution state and memory isolation capabilities in the TD architecture.

Figure 2A:
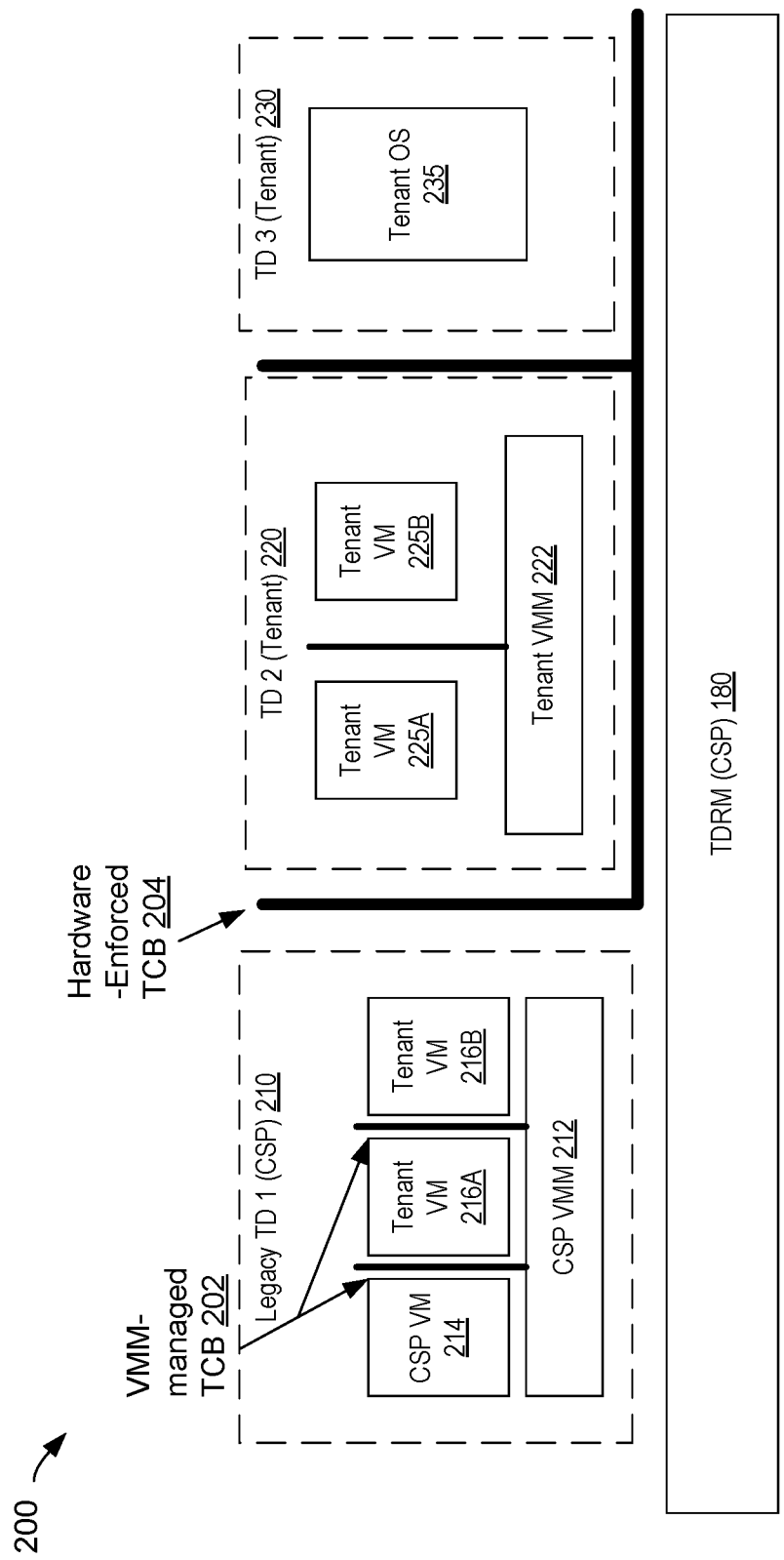
FIG. 2A is a block diagram of an example of a trust domain architecture according to one implementation.

FIG. 2A is a block diagram depicting an example computing system implementing TD architecture 200. The TD architecture 200 supports two types of TDs. A first type of TD is a TD where the tenant trusts the CSP to enforce confidentiality and does not implement the TD architecture of implementations of the disclosure. This type of legacy TD is depicted as TD1 210. TD1 210 is a CSP TD having a CSP VMM-managed TCB 202. TD1 210 may include a CSP VMM 212 managing a CSP VM 214 and/or one or more tenant VMs 216A, 216B. In this case, the tenant VMs 216A, 216B are managed by the CSP VMM 212 that is in the VM's 216A, 216B TCB 202. In implementations of the disclosure, the tenant VMs 216A, 216B may still leverage memory encryption via TME or MK-TME in this model (described further below).

The other type of TD is a TD is a TD where the tenant does not trust the CSP to enforce confidentiality and thus relies on the CPU with TD architecture of implementations of the disclosure. This type of TD is shown in two variants as TD2 220 and TD3 230. The TD2 220 is shown with a virtualization mode (such as VMX) being utilized by the tenant VMM (non-root) 222 running in TD2 220 to managed tenant VMs 225A, 225B. The TD3 230 does not include software using a virtualization mode, but instead runs an enlightened OS 235 in the TD3 230 directly. TD2 220 and TD3 230 are tenant TDs having a hardware-enforced TCB 204 as described in implementations of the disclosure. In one implementation, TD2 220 or TD3 230 may be the same as TD 190A described with respect to FIGS. 1A and/or 1B.

The TDRM 180 manages the life cycle of all three types of TDs 210, 220, 230, including allocation of resources. However, the TDRM 180 is not in the TCB for TD types TD2 220 and TD3 230. The TD architecture 200 does not place any architectural restrictions on the number or mix of TDs active on a system. However, software and certain hardware limitations in a specific implementation may limit the number of TDs running concurrently on a system due to other constraints.

Figure 2B:
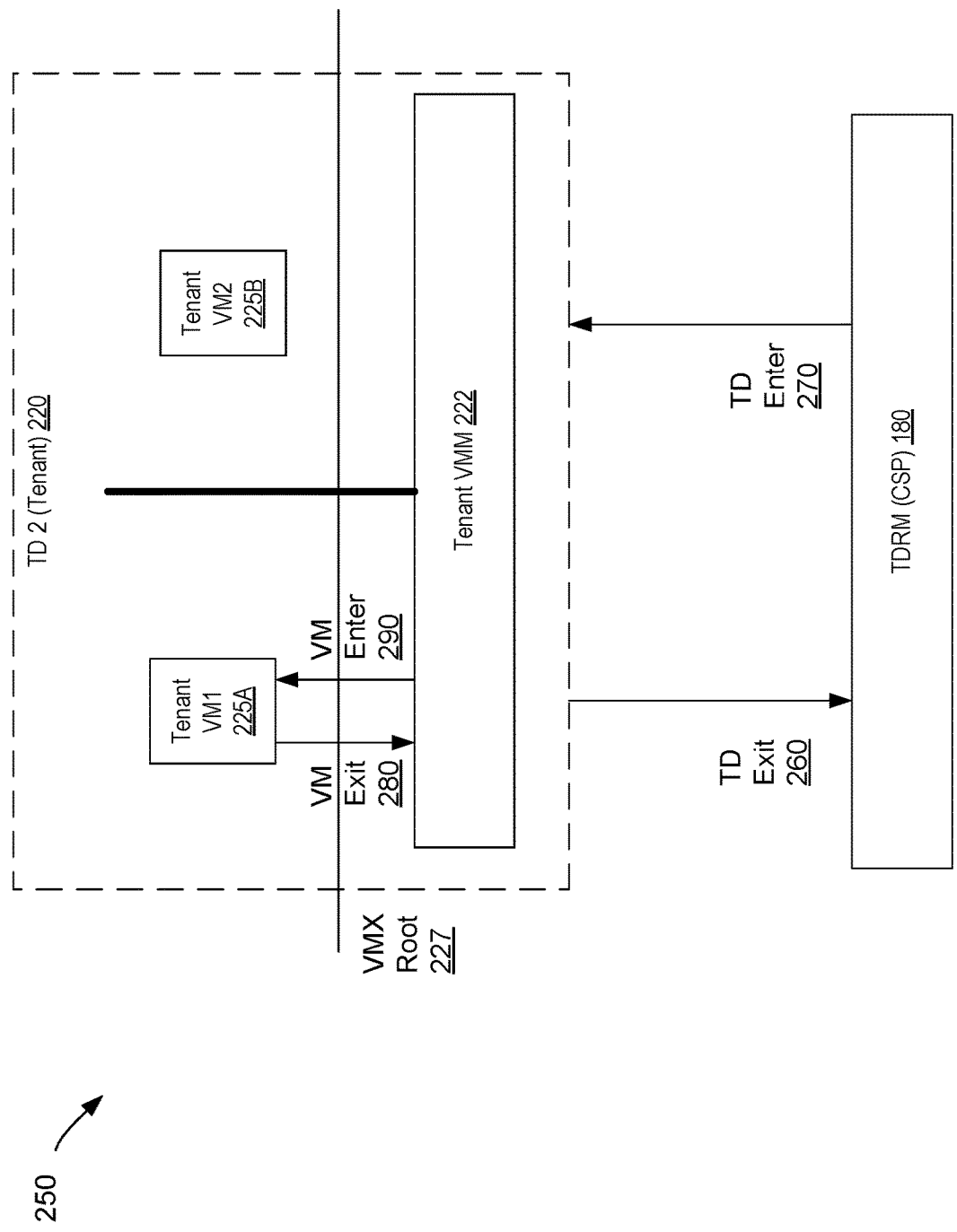
FIG. 2B is a block diagram of another example of a trust domain architecture according to one implementation.

FIG. 2B is a block diagram depicting an example of a TD architecture 250 and the interactions between a TD 220 and TDRM 280. In one implementation, TD 220 and TDRM 280 are the same as their counterparts described with respect to FIG. 2A. The TD architecture 250 may be the same as a TD architecture provided by computing device 100 of FIGS. 1A and 1B, and/or TD architecture 200 of FIG. 2A. TD architecture 250 provides a layer that manages lifecycle of TDs active on a system. Processor support for TDs is provided by a form of processor operation called a TDX operation. There are two kinds of TDX operations: a Resource-Manager operation and a Tenant operation. In general, the TDRM 180 runs in TDX Resource-Manager operation and TDs, such as TD2 220, run in TDX Tenant operation. Transitions between Resource-Manager operation and Tenant operation are called TDX transitions.

There are two kinds of TDX transitions: TD entry 270 and TD exit 260. Transitions from TDX Resource-Manager operation into TDX Tenant operation are called TD entries 270. Transitions from TDX Tenant operation to TDX Resource-Manager operation are called TD exits 260.

Processor behavior in TDX Resource-Manager operation is similar as it is outside of TDX operation. The principal differences are that a set of TDX operations (TDX instructions) is available and that values that can be loaded into certain control registers are limited to restrict the modes and abilities of the TDRM 180.

Processor behavior in TDX Tenant operation is similarly restricted to facilitate isolation. For example, instead of ordinary operation, certain events cause TD exits 260 to the TDRM 180. These TD exits 260 do not allow the TDRM 180 to modify TD 220 behavior or state. The TDRM 180 uses platform capabilities to retain control of platform resources. Software running in a TD 220 may use software-visible information to determine it is running in a TD 220, and may enforce local measurement policies on additional software loaded into the TD 220. However, validating the security state of the TD 220 is performed by a remote attestation party to ensure confidentiality.

The TD architecture 250 is designed to minimize compatibility impact on software that relies on virtualization when running in a TD 220, and therefore, leaves most interactions between a VM 225A, 225B running in Tenant operation and a Tenant VMM 222 running in Tenant operation unchanged. If there is no VMM 222 present in a TD 220, a VM OS may be modified to work with TDRM 180 as the root VMM.

In one implementation, the TDRM 180 may explicitly decide to cause a TD exit 260, for example, to terminate a TD 120 or to manage memory resources (e.g., yield assigned memory resource, request free memory resources, etc.). The TD architecture 250 also provides the TDRM 180 with the ability to force TD exits 260 for preemption. On TD exits 260, the TD architecture enforces that the execution state of a TD 220 is saved in CPU access-controlled memory allocated to the TD 220 and encrypted using a unique encryption key (discussed further below) of the TD 220 that is not visible to TDRM 180 or other TDs to protect confidentiality of TD state from the TDRM 180 or other TDs. The TD execution state may similarly be protected against spoofing, remapping and/or replay via integrity controls on memory.

TD enter 270 is a complementary event to TD exit 260. For example, a TD enter 270 may occur when the TDRM 180 schedules a TD 220 to run on a logical processor and transfers execution to the software running in the TD 220. During TD enter 270, the TD architecture 250 enforces that the execution state of the TDRM 180 is saved in memory owned by the TDRM, which is encrypted using a unique encryption key assigned for sole use by the TDRM 180.

TDs, such as TD 220, can be set up by the TDRM 180 using a TDCREATE (to create TDCS), TDTCREATE (to create TD-TCS) and TDADDPAGE instructions that causes memory belonging to a TD 220 to be encrypted using the TD's unique encryption key that is not visible or accessible to the TDRM 180 or other TDs. Before executing any instructions belonging to a TD, all TD memory is encrypted using the TD's unique key. Although specific instruction names are referenced herein, other names for the instructions may be utilized in implementations of the disclosure and are not limited to the specific names provided herein.

In one implementation, the TDRM 180 can launch each TD 220 with a small software image (similar to IBB or Initial Boot Block) after signature verification and record the IBB measurements (for subsequent attestation) using a platform root of trust. It is the IBB software executing in the TD 220 that is responsible for completing the measured launch of the TD 220 and requesting additional resources from the TDRM 180. The TD 220 has the option to use a single encryption key for the entire TD 220 or use additional encryption keys for different Tenant VMs 225A, 225B (and/or containers or different memory resources such as NVRAM) when running inside the TD 220. Thus, when the TD 220 is first set up, the TD 220 is using an exclusive CPU-generated MK-TME key. Thereafter, the TD 220 may optionally set up additional MK-TME encryption keys for each tenant software-managed context that operates inside the TD 220 (e.g., tenant VMs 225A, 225B, containers or other memory types).

In order to minimize software compatibility impact on VMMs both for CSP (e.g., TDRM root VMM 180 and tenant VMM 222), virtualization (e.g., VMX) operation may remain unmodified inside a TD 220 in TD architecture 250. Similarly, operation of VMM software, such as extended page table (EPT) management, can remain under the control of the tenant VMM 222 (if one is active in the TD 220 and is not managed by the TDRM 180). As the TDRM 180 assigns physical memory for each TD 220, the TD architecture 250 includes the MOT (i.e., MOT 160 described with respect to FIGS. 1A and 1B). The processor 112 consults the TDRM 180-managed MOT to assign allocation of memory to TDs 220. This allows the TDRM 180 the full ability to manage memory as a resource without having any visibility into data resident in assigned TD memory. In some implementations, as discussed above, the platform (e.g., root) VMM and TDRM 180 may be in the same encryption key domain, thus sharing the memory management and scheduler functions (but still remaining outside the Tenant's TCB).

Figure 3:
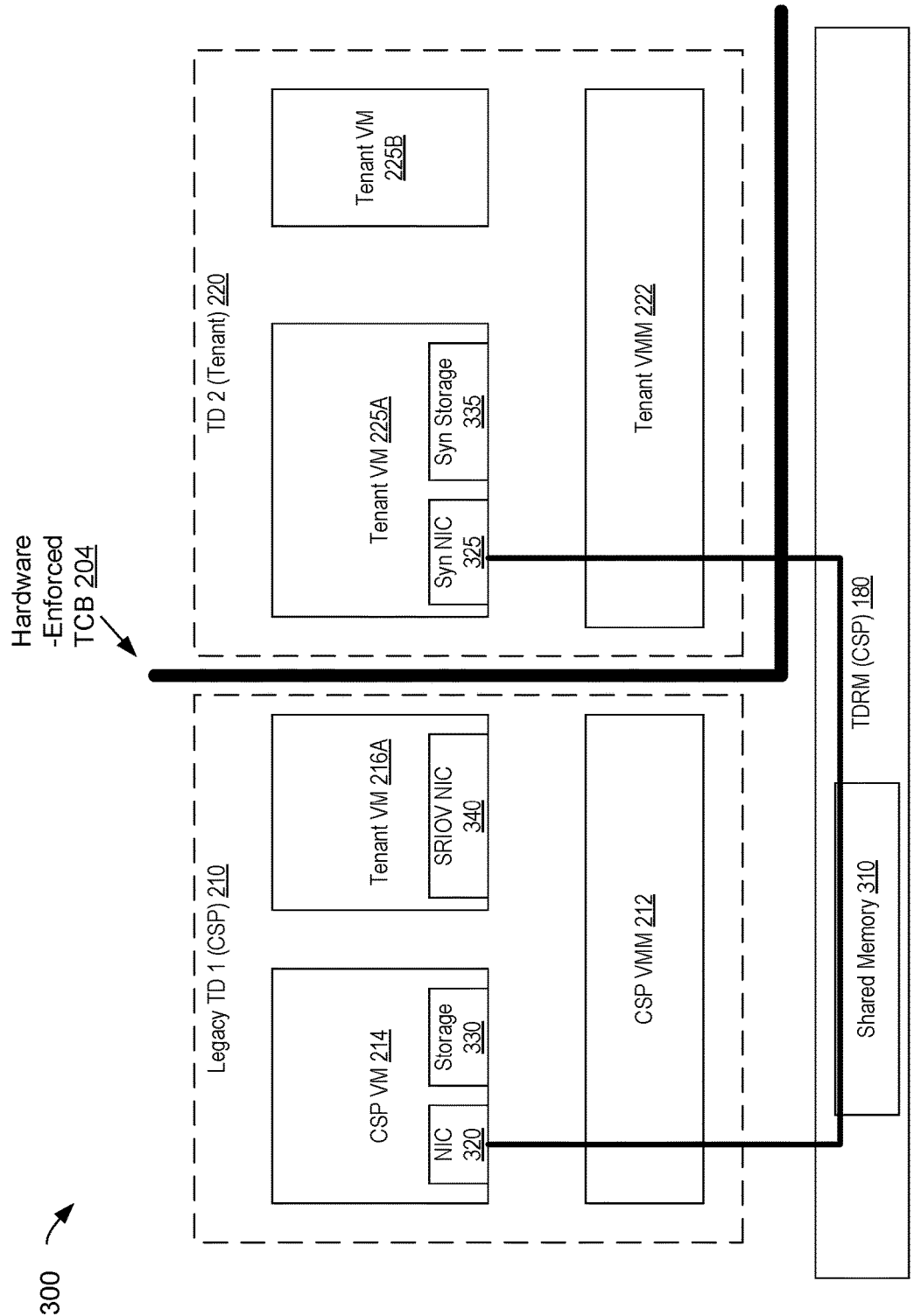
FIG. 3 is a block diagram of a further example of a trust domain architecture according to one implementation.

FIG. 3 is a block diagram depicting another example of a TD architecture 300. TD architecture 300 depicts an I/O concept for a TD. In one implementation, the TD architecture 300 may allow all I/O devices (e.g., NIC 320, storage 330, single-root input/output virtualization (SR-IOV) NIC 240, etc.) to be attached to a TD1 210 that trusts the CSP and TDRM (e.g., legacy TD 1 210). In one implementation, the TD architecture 300 may not allow direct assignment of a device (including SR-IOV and scalable I/O) to a TD, such as tenant TD2 220, that does not trust CSP software (e.g., tenant TD2 220). Instead, the TDRM 180 may provide a capability to share memory 310 between a CSP TD, such as TD1 210, and other TDs, such as tenant TD 2 220, to implement synthetic ("syn") devices (e.g., syn NIC 325, syn storage 335) in non-CSP TDs (e.g., tenant TD2 220). In some implementations, tenant TDs, such as tenant TD2 220, that do not trust CSP software may be responsible for protecting I/O data. The TD architecture 300 may not protect I/O data exposed via shared memory 310. In some implementations, I/O data may be protected by using existing security protocols between the communicating endpoints.

Referring back to FIG. 1B, the MOT 160 (which may be referred to as TD-MOT) is a structure, such as a table, managed by the processor 112 to enforce assignment of physical memory pages to executing TDs, such as TD 190A. The processor 112 also uses the MOT 160 to enforce that the physical addresses referenced by software operating as a tenant TD 190A or the TDRM 180 cannot access memory not explicitly assigned to it.

The MOT 160 enforces the following properties. First, software outside a TD 190A should not be able to access (read/write/execute) in plain-text any memory belonging to a different TD (this includes TDRM 180). Second, memory pages assigned via the MOT 160 to specific TDs, such as TD 190A, should be accessible from any processor in the system (where the processor is executing the TD that the memory is assigned to).

The MOT 160 structure is used to hold meta-data attributes for each 4 KB page of memory. Additional structures may be defined for additional page sizes (2 MB, 1 GB). The meta-data for each 4 KB page of memory is direct indexed by the physical page address. In other implementations, other page sizes may be supported by a hierarchical structure (like a page table).

A 4 KB page referenced in the MOT 160 can belong to one running instance of a TD 190A. 4 KB pages referenced in the MOT 160 can either be valid memory or marked as invalid (hence could be IO for example). In one implementation, each TD instance 190A includes one page holding a TDCS 124 for that TD 190A.

In one implementation, the MOT 160 is aligned on a 4 KB boundary of memory and occupies a physically contiguous region of memory protected from access by software after platform initialization. In an implementation, the MOT is a micro-architectural structure and cannot be directly accessed by software. Architecturally, the MOT 160 holds the following security attributes for each 4 KB page of host physical memory:

Page Status 162—Valid/Invalid bit (whether the page is valid memory or not)

Page Category—DRAM, NVRAM, IO, Reserved

Page State 163—(4 bit vector) specifies if the page is:
  bit 1—Free (a page that is not assigned to a TD and not used by the TDRM)
  bit 2—Assigned (a page assigned to a TD or TDRM)
  bit 3—Blocked (a page blocked as it is in the process of freeing/(re)assigning)
  bit 4—Pending (a dynamic page assigned to the TD but not yet accepted by TD)

TDID 164—(40 bit) TD Identifier that assigns the page to a specific unique TD. Address of the TDCS.

In some implementations, an extended MOT 160 entry may be supported which further includes:

Page Key ID 165—(8 bits—size is implementation specific) Specifies the per page encryption key expected to be matched to the Key ID fetched during the processor page walk for physical memory referenced by a TD. If the MOT 160 entry is not an extended entry, the Page Key ID is derived from the TDCS 124. One of the key Id values specified in the MOT may be used to share memory contents with the TDRM (or the root VMM). The shared pages may hold Input-output buffers to be sent to a hardware device managed by the TDRM. Similarly shared pages may be used for emulation of virtual devices exposed to the TD by the TDRM.

Guest Physical Address 166—(52 bits) Specifies the expected Guest Physical Address used by software executing in a TD. (This field is used when the TDRM 180 expects to perform memory remapping and implements the ability to swap memory).

Guest Permissions 167—to assert on the final page (Read, Write, Execute for user and supervisor). There may be multiple sets of these permissions bits to support VMMs executing in a TD.

The MOT 160 may be enabled when TDX is enabled in the processor 112 (e.g., via CR4 enable bit, after CPUID-based enumeration). Once the MOT 160 is enabled, the MOT 160 can be used by the processor 112 to enforce memory access control for all physical memory accesses initiated by software, including the TDRM 180. In one implementation, the access control is enforced during the page walk for memory accesses made by software. Physical memory accesses performed by the processor 112 to memory that is not assigned to a tenant TD 190A or TDRM 180 fail with Abort page semantics.

In implementations of the disclosure, the TDRM 180 manages memory resources via the MOT 160 using a MOT operation instruction (TDMOTOP) with the following instruction leaves:

Add page to MOT (TDMOTADDPAGE)—Marks a free MOT 160 entry corresponding to a host physical address (HPA) as assigned (exclusively) to a TD 190A specified by a TDID. Any other prior page state causes a fault. This instruction forces a cross-thread TLB shootdown to confirm that no other TD 190A is caching a mapping to this HPA. This instruction leaf can be invoked by the TDRM 180. If the TDRM 180 has enabled an extended MOT, then the instruction can specify the initial guest physical address (GPA) that is mapped to the specified HPA. The processor 112 verifies that the GPA is mapped to the HPA by walking the EPT structure managed by the TDRM 180. A variant of the Add page may be implemented, which assigns a page to a TD (TDMOTAUGPAGE) but does not capture a measurement of the page.

Revoke page from MOT (TDMOTREVOKEPAGE)—Marks an assigned page as a free page. This instruction forces a cross-thread TLB shootdown to confirm that subsequent TD 190A accesses check for HPA ownership, and that the page contents are cleared by the processor 112. A TD 190A access that experiences a MOT 160 page fault during TLB fill causes the processor 112 to invalidate the TDCS 124, which prevents further TD enter into the TD 190A. This instruction leaf may be invoked by the TDRM 180.

Block page in MOT (TDMOTBLOCKPAGE)—Marks a free or assigned MOT 160 entry corresponding to an HPA as blocked for software usage. Any other prior page state causes a TDRM 180 fault. This instruction forces a cross-thread TLB shootdown to confirm that subsequent TD 190A accesses check for HPA ownership. This instruction leaf may be invoked by the TDRM 180.

Unblock page in MOT (TDMOTUNBLOCKPAGE)—Marks a blocked MOT 160 entry corresponding to an HPA as valid for software usage/assignment. Any other prior page state causes a fault. This instruction leaf can be invoked by the TDRM 180.

Memory assigned to a TD 190A may be returned to the TDRM 180 via an explicit TDCALL after the TD software has cleared any secrets in memory. Extended operation of the MOT 160 is used for case where: (1) a VMM in the TD 190A may have remapped GPAs in use inside the TD, and/or (2) the TDRM 180 may want to swap memory assigned to the TD 190A. In both cases above, a TDRM 180 EPT violation would be generated with the mismatched GPA used during the page walk. The following extended MOT instruction leaves address the cases above:

Modify PGA in MOT (TDMOTMODPMA)—To handle the first case above, the TDRM 180 utilize this extended MOT 160 instruction to update the MOT 160 security attributes for the page used by the TD 190A. The TDRM 180 provides a GPA which is used by the CPU to walk the TD VMM-managed EPT structure and retrieves the new GPA referenced by the TD VMM. The processor 112 then performs a walk of the TDRM 180 EPT to find the referenced HPA, and if the page is assigned to the active TD 190A, the expected GPA attribute is updated to match the mismatched GPA reported during the walk that faulted. The TDRM 180 can then resume the TD 190A.

For the second case above, the TDRM 180 has already unmapped the GPA from its EPT structure, and on the fault, should use the block page in MOT instruction (TDMOD-BLOCKPAGE) to mark the page as software unusable (with flush), and should use the extended MOT 160 instructions: TDEXTRACT and TDINJECT to create a cryptographically-protected swappable version of the page contents which can be restored for a new assigned HPA. The TDEXTRACT (and TDINJECT) instructions capture (and verify resp.) cryptographically signed integrity information for the swapped TD pages so they can be verified when being restored. The cryptographic information may include counters to ensure that a malicious TDRM cannot replay stale pages.

In one implementation, initialization of the TDRM 180 begins with enabling TDX in the processor 112 by setting, for example, the CR4.TDXE bit or via a VMX MSR control bit during VMXON. TDX support can be enumerated via a CPUID. Once TDX is enabled, the TDRM 180 performs (i.e., executes) an enable TDX mode instruction (TDXON) to enable a TDX mode of the processor; alternately the mode may be enabled as part of VMXON. TDXON registers a naturally-aligned 4-KB region of memory that a logical processor uses for a TDRM 180 state area. In one implementation, the TDRM 180 state area is stored in a TDRM control structure (TDRCS) 182 as TDRM state 185; the TD-RCS may also be implemented as a new type of VMCS which only contains host state, controls and TD exit info. In one implementation, the TDCS and TD-TCS are access-controlled via the MOT 160 (e.g., an encryption key ID stored in the MOT 160 is used to enforce memory access controls). In another implementation, the TDCS and TD-TCS are access-controlled via storage in a restricted range register(s), such as range registers 130, of the processor 112 that is inaccessible to software accesses. TDRM state 185 is described in further detail below. The physical address of the 4 KB page used for the TDRCS 182 is provided in an operand to TDXON. The TDRM 180 makes this page inaccessible to all TDs 190A via the MOT 160. The TDRM 180 should initialize and access the TDRCS 185. The TDRM 180 should use a separate TDRCS 185 for each logical processor.

In one implementation, an example TDRM state 185 initialized by the TDRM 180 and loaded by the processor 112 on TD exit may include, but is not limited to, the following state depicted in Table 1 below:

TABLE 1

| Processor State (64 bit) loaded from TDRCS on TD Exit | |
|---|---|
| Field | Description |
| RIP | Linear address in TDRM address space where execution starts in TD root mode on a TD Exit |
| RSP | TDRM stack pointer (linear address) |
| ES Selector | Segment info |
| CS Selector | Segment info |
| SS Selector | Segment info |
| DS Selector | Segment info |
| FS Selector | Segment info |
| GS Selector | Segment info |
| TR Selector | Segment info |
| FS Base | Segment base |
| GS Base | Segment base |
| TR Base | Segment base |
| GDTR Base | Segment base |
| IDTR Base | Segment base |
| CR0 | Force PG/NE/PE = 1, ignore CD/NW |
| CR3 | Allow TDRM to specify |

TABLE 1-continued

| Processor State (64 bit) loaded from TDRCS on TD Exit | |
|---|---|
| Field | Description |
| CR4 | Force VMXE/PAE = 1 |
| IA32_PAT | Allow TDRM to specify |

The following processor state is set/fixed automatically during TD Exit (hence is not specified in the TD-RCS):
CR0, CR4 for 64 bit mode (May need an additional CR4 mask value)
DR7, scrub DRs: cleared: need to consider PDR bit implications
IA32_DEBUGCTL, IA32_PERF_GLOBAL_CTRL, IA32_PAT, IA32_BNDCFGS
IA32_EFER (ensure 64 bit mode)
Segment registers (base limit access): same as VM exit
RFLAGS: same as VM exit—set to 0×2
LDTR: same as VM exit—null
The following processor state is cleared automatically during TD Exit (hence is not specified in the TD-RCS):
IA32_SYSENTER_CS/EIP/ESP
IA32_KERNEL_GS_BASE
IA32_STAR/FMASK/LSTAR
GPRs (except RSP)
XSAVE state
Extended state (x87/SSE, CET etc.)—May treat as optional and other conditional state The TD-RCS also holds the control fields and the exit info structure (for reporting TD exit information), as provided below in Table 2:

TABLE 2

| TD-RCS Structure | |
|---|---|
| Field | Description |
| MSR access-control bitmap address | 64 bit physical address of 4 KB page holding the MSR access-control bitmaps |
| XSAVES access-control bitmap | 64 bit XSAVES access-control bitmap |
| Extended Page Table Pointer | 64 bit EPTP |
| TD Pre-emption Timer | 64 bit TD Pre-emption timer |
| TD-TCS Slot Id | Link this TD-RCS to a specific TD-TCS for duration of TD entry |

Table 3 depicted below details Exit information fields in the TD-RCS:

TABLE 3

| TD-RCS Exit information fields | |
|---|---|
| Field | Description |
| TDEXIT_REASON | 64 bit value (n bits valid, 64-n bits reserved). See Table below for values. |
| TDEXIT_QUAL | See Table below. |

In one implementation, a TD 190A may be created and launched by the TDRM 180. The TDRM 180 creates a TD 190A using a TD create instruction (TDCREATE and TDTCREATE). The TDRM 180 selects a 4 KB aligned region of physical memory and provides this as a parameter to the TD create instruction. This region of memory is used as a TDCS 124 for the TD 190A. When executed, the TDCREATE instruction causes the processor 112 to verify that the destination 4 KB page is assigned to the TD (using the MOT 160). The TDCREATE instruction further causes the processor 112 to generate an ephemeral memory encryption key and key ID for the TD 190A, and store the key ID in the TDCS 124. The processor 112 then initializes the page contents on the destination page using the encryption key assigned to the TD. In one implementation, initializing the page contents includes initiating the TD state of the TD, which is described further below with respect to the TDTCS 128. The TDCREATE instruction then causes the processor 112 to initialize a hash for a TD measurement in the TDCS 124.

In one implementation, the TDRM 180 sets up the IBB code/data for the TD 190A using a TDADDPAGE instruction (discussed above) that specifies the address of the TDCS 124 page (of the TD 190A) as a parameter, an address of a code/data page for the TD image in TDRM address space, and the physical page assigned to the TD 190A. The processor 112 then verifies that the destination 4 KB page is assigned to the TD 190A. Once verified, the processor 112 extends the hash for the TD 190A in the TDCS 124. Then, the processor copies the page contents from source to destination page using the unique encryption key assigned to the TD 190A.

The TDRM 180 provides TD boot configuration via a data page containing physical memory map (and an identity page table). The TDRM 180 initializes physical memory and the processor 112 verifies that the pages are assigned to the TD 190A and identifies page table. The TDRM 180 then finalizes the measurement of the TD 190A using a TDINIT instruction. The TDRM 180 may then start execution of the TD 180 using a TDENTER instruction (this uses a TDTCS 128 as described further below).

Referring now to the TDCS 124, this control structure specifies controls that the processor 112 initializes when a TD 190A is created successfully. The TDCS 124 is available when the TD 190A is enabled. In one implementation, the TDCS occupies a 4 K naturally aligned region of memory. A page identified as a TDCS 124 in the MOT 160 is blocked against software reads/writes after the TDCREATE instruction is successfully executed. In one implementation, the TDCS 124 is access-controlled via the MOT 160 (e.g., as described above, an assigned key ID for the TDCS 124 stored in the MOT 160 is used during page walks of the processor 112 to prevent unauthorized software read/write). In another implementation, the TDCS 124 is access-controlled via storage in a restricted range register(s) of the processor 112 that is inaccessible to software accesses. The TDCS 124 may include, but is not limited to, the following fields depicted below in Table 4:

TABLE 4

TDCS Structure

| Field | Size (bytes) | Description |
| --- | --- | --- |
| REVISION | 4 | Revision Identifier 126 |
| TDID | 8 (40 bits valid, rest reserved) | TD Identifier 190A |
| COUNT_TCS | 4 (16 bits valid, rest reserved) | Number of TD-TCSs 142 associated with this TDCS |
| COUNT_BUSY_TCS | 4 (16 bits valid, reset reserved) | Number of busy TD-TCSs associated with this TDCS |

TABLE 4-continued

TDCS Structure

| Field | Size (bytes) | Description |
| --- | --- | --- |
| KID_ENTRY_0* | 8 (8 bits valid, rest reserved) | Ephemeral Key Id* for Key assigned to TD 190A during TDCREATE |
| KID_ENTRY_1 | 8 (8 bits valid, rest reserved) | Key Id 1 assigned to TD during TDCREATE. TD Can assign a key via PCONFIG. |
| KID_ENTRY_2 | 8 (8 bits valid, rest reserved) | Key Id 2 assigned to TD during TDCREATE. TD Can assign a key via PCONFIG |
| KID_ENTRY_3 | 8 (8 bits valid, rest reserved) | Key Id 3 assigned to TD during TDCREATE. TD Can assign a key via PCONFIG. |
| ATTRIBUTES | 16 (See Table below) | Attributes of Trust Domain |
| MRTD | 48 | SHA-384 measurement 138 of the initial contents of the TD |
| RESERVED | 16 (must be zero) | Reserved for MREG growth to SHA512. |
| MRSWID | 48 | Software defined identifier for additional logic loaded after initial builds |
| MRCONFIGID | 48 | Software defined identifier for additional TD SW configuration. |
| MROWNER | 48 | Software defined identifier for VM's owner |
| MROWNERCONFIG | 48 | Software defined identifier for additional image config from owner. |
| XCR0 | 8 | Initial values of XCR0 |
| OWNERID | 8 | Owner ID |
| MRTDBLOCKS | 4 | Number of blocks updated into MRTD. (Only needed pre-TDINIT) |
| COUNT_TCS_MAX | | Max value specifies maximum number of logical processors that may be assigned to this TD. (max possible 4095). |
| RESERVED | | Reserved (other TD metadata) 143 |

The TDCS.ATTRIBUTES field has the following bit structure depicted below in Table 5:

TABLE 5

TDCS.ATTRIBUTES field bit structure

| Field | Bit position | Description |
| --- | --- | --- |
| INIT | 0 | This bit specifies if the TD has been initialized by TDINIT. |
| GROUP | 1 | This bit specifies if the TD can share an Ephemeral key for TDs with the same TDCS.OWNERID and TDCS.MRTD. This attribute can be enabled only when the extended MOT is supported. |
| DEBUG | 2 | This bit specifies if the TD is a debug TD (See Section X for TD Debug architecture). |

TABLE 5-continued

TDCS.ATTRIBUTES field bit structure

| Field | Bit position | Description |
|---|---|---|
| RESERVED | 63:3 | Reserved |
| XFRM | 127:64 | XSAVE Feature Request Mask. |
| XFRMS | 255:65 | to express XSAVES supervisor state |

A TD 190A may request the TDRM 180 to assign N logical processor(s) (CPUs) to the TD 190A. For each requested CPU, the TDRM 180 adds a TDTCS 128 page into the TD 190A using TDADDPAGE (parameters<op, TDCS, TD CPU index, HPA>). The processor 112 verifies that destination 4 KB page is assigned to the TD 190A. The processor 112 updates the TCSList [index] 142 in the TDCS 124 for the TD 190A. The TDTCS 128 may back-reference its parent TDCS 124 (which is specified in the TDADD-PAGE instruction parameters).

The TDRM 180 uses the TDTCS 128 to TDENTER (parameters<TDCS, CPU index>) into a TD 190A. This activates the TDTCS 128 (and the referenced TDCS 124). The TDENTER instruction checks that the TDTCS 128 is not already active. On TDENTER, the processor 112 activates the TD 190A Key ID enforcement by the page miss handler (PMH)/TLB. The processor 112 then loads the TD state from the TDTCS 128 and starts the TD 190A execution.

The TDTCS 128 holds the execution state for logical processors assigned to a TD 190A. If a TD exit condition occurs when the processor 112 is in TD Tenant mode, the TD exit saves the execution state of the tenant in the TDTCS 128. In one implementation, the TDTCS 128 is access-controlled via the MOT 160 (e.g., as described above, key ID used during page walks of the processor 112 to prevent unauthorized software read/write). In another implementation, the TDTCS 128 is access-controlled via storage in a restricted range register(s) of the processor 112 that is inaccessible to software accesses.

If the TD exit occurs when the processor 112 is operating in the context of a non-root VMM inside a TD 190A, the TD exit performs a VM exit (e.g., VM exit 280 of FIG. 2B) to the TD VMM (e.g., TD VMM 222)(not reported yet), saves the tenant VMM state in the TDTCS 128, and performs a TD exit (switches key id enforcement). A subsequent TDENTER invoked by the TDRM 180 performs a key-ID enforcement switch, restores tenant state from the TDTCS 128 (inside the TD 190A) in order to resume the tenant VMM or OS. Correspondingly, if the processor 112 was operating in the context of a non-root VMM during a prior TD exit, the TD enter reports a VM exit (on TD entry) to the tenant VMM.

As discussed above, the TDTCS 128 holds the execution state of the TD 190A. The execution state of the TD 190A stored in the TDTCS 128. TDTCS may be non-architectural and may hold the fields detailed below in Tables 6 thru 9:

TABLE 6

TDTCS fields

| Field | Description |
|---|---|
| STATE | Execution state of the TD virtual processor. A value of 0 indicates that this TD-TCS is available for TDENTER. A value of 1 indicates that the TD-TCS is active on a logical processor (is currently executing a TD using this TD-TCS). |
| TDCS | Linkage back to "parent" TDCS (64b HPA) |
| FLAGS | TD-TCS execution flags (See Table X below) |
| TD_STATE_S | TD state corresponding to supervisor mode. See Table below. |
| TD_STATE_U | TD state corresponding to user state. See Table below. |

TABLE 7

TDTCS Execution flags

| Field | Bit Position | Description |
|---|---|---|
| DEBUG | 0 | Debug opt-in flag for TD-TCS |
| RESERVED | 63:1 | NA |

TABLE 8

TDTCS Supervisor Execution state

| Field | Description |
|---|---|
| CR0 | Initial state setup by TDCREATE - subsequent loads apply a mask |
| CR2 | Loaded as saved, initialized to 0 |
| CR3 | Loaded as saved, initialized by TD OS |
| CR4 | Initial state setup by TDCREATE - subsequent loads apply a mask |
| DR0 | Loaded as saved, initialized clear |
| DR1 | Loaded as saved, initialized clear |
| DR2 | Loaded as saved, initialized clear |
| DR3 | Loaded as saved, initialized clear |
| DR6 | Loaded as saved, initialized clear |
| DR7 | Loaded as saved, initialized to disable debug |
| IA32_SYSENTER_CS | Loaded as saved, initialized by TD OS |
| IA32_SYSENTER_ESP | Loaded as saved, initialized by TD OS |
| IA32_SYSENTER_EIP | Loaded as saved, initialized by TD OS |
| SYSCALL MSRs | Loaded as saved, initialized by TD OS |
| IA32_EFER | Loaded as saved, initialized by TD OS |
| IA32_PAT | Loaded as saved, initialized by TD OS |
| IA32_BNDCFGS | Loaded as saved, initialized by TD OS |
| ES Segment Info | Selector, Base, Limit, ARByte |
| CS Segment Info | Selector, Base, Limit, ARByte |
| SS Segment Info | Selector, Base, Limit, ARByte |
| DS Segment Info | Selector, Base, Limit, ARByte |
| FS Segment Info | Selector, Base, Limit, ARByte |
| GS Segment Info | Selector, Base, Limit, ARByte |
| LDTR Segment Info | Selector, Base, Limit, ARByte |
| TR Segment Info | Selector, Base, Limit, ARByte |
| GDTR Base | Loaded as saved, initialized by TD OS |
| GDTR Limit | Loaded as saved, initialized by TD OS |
| IDTR Base | Loaded as saved, initialized by TD OS |
| IDTR Limit | Loaded as saved, initialized by TD OS |
| RIP | Loaded as saved, initialized by TDCREATE for IBB |
| RSP | Loaded as saved, initialized by TDCREATE for IBB |
| RFLAGS | Loaded as saved, initialized by TDCREATE for IBB |
| PDPTEs* (32 bit PAE) | Loaded as saved, initialized by TD OS |
| IA32_XSS | Loaded as saved, initialized by TD OS |
| XCR0 | Loaded as saved, initialized by TD OS |
| Kernel_GS_BASE | Loaded as saved, initialized by TD OS |
| TSC_AUX | Loaded as saved, initialized by TD OS |

TABLE 9

TDTCS additional fields

| Field | Description |
| --- | --- |
| RAX | Loaded as saved, initialized by TD OS |
| RBX | Loaded as saved, initialized by TD OS |
| RCX | Loaded as saved, initialized by TD OS |
| RDX | Loaded as saved, initialized by TD OS |
| RBP | Loaded as saved, initialized by TD OS |
| RSI | Loaded as saved, initialized by TD OS |
| RDI | Loaded as saved, initialized by TD OS |
| R8 | Loaded as saved, initialized by TD OS |
| R9 | Loaded as saved, initialized by TD OS |
| R10 | Loaded as saved, initialized by TD OS |
| R11 | Loaded as saved, initialized by TD OS |
| R12 | Loaded as saved, initialized by TD OS |
| R13 | Loaded as saved, initialized by TD OS |
| R14 | Loaded as saved, initialized by TD OS |
| R15 | Loaded as saved, initialized by TD OS |
| XSAVE state | Loaded as saved, initialized by TD OS |

In one implementation, a TD 190A may be destroyed by the TDRM 180. The TDRM 180 destroys a TD 190A using a TD destroy instructions (TDDESTROY and TDTDE-STROY). The CPU verifies that all memory assigned to the TD has been revoked, and all TD-TCSs are destroyed before it allows a TDCS to be destroyed.

FIG. 4 is a flow diagram of an example method 400 for providing isolation in virtualized systems using TDs according to one implementation. Method 400 may be performed by processing logic that may comprise hardware (e.g., circuitry, dedicated logic, programmable logic, microcode, etc.), software (such as operations being performed by the MCU), firmware or a combination thereof. In one implementation, method 400 is performed by processing device 112 of FIG. 1A or FIG. 1B. In another implementation, the method 400 is performed by any of the processing devices described with respect to FIGS. 7-12. Alternatively, other components of the computing system 100 (or software executing on the processing device 112) may perform some or all of the operations of the method 400.

Referring to FIG. 4, the method 400 begins at block 410 when the processing logic executes a TDRM to manage a TD comprising a VM, the TD executed by the processing device. At block 420, the processing logic maintains a TDCS for managing global metadata of one or more of the TD or other TDs executed by the processing logic. Then, at block 430, the processing logic maintains an execution state of the TD in a TD-TCS that is access-controlled against software accesses from at least one of the TDRM, a VMM, or the other TDs executed by the processing device.

Subsequently, at block 440, the processing logic references the MOT to obtain at least one key ID corresponding to an encryption key assigned to the TD. In one implementation, the key ID allows the processing logic confidential access to memory pages assigned to the TD responsive to the processing device executing in the context of the TD, where the memory pages assigned to the TD encrypted with the encryption key. Lastly, at block 450, the processing logic references the MOT to obtain a guest physical address corresponding to a host physical memory page assigned to the TD. In one implementation, a match of the guest physical address obtained from the MOT with an accessed guest physical address allows the processing device access to the memory pages assigned to the TD responsive to the processing device executing in the context of the TD.

FIG. 5 is a flow diagram of an example method 500 for performing a TD exit when providing isolation in virtualized systems using TDs, according to one implementation. Method 500 may be performed by processing logic that may comprise hardware (e.g., circuitry, dedicated logic, programmable logic, microcode, etc.), software (such as operations being performed by the MCU), firmware or a combination thereof. In one implementation, method 500 is performed by processing device 112 of FIG. 1A or FIG. 1B. In another implementation, the method 500 is performed by any of the processing devices described with respect to FIGS. 7-12. Alternatively, other components of the computing system 100 (or software executing on the processing device 112) may perform some or all of the operations of the method 500.

Referring to FIG. 5, the method 500 begins at block 510 when the processing logic identifies a TD exit event. In one implementation, a TDRM is managing a TD associated with the TD exit event, where the processing logic is executing in a context of the TD when the TD exit event is identified.

At block 520, the processing logic, responsive to identifying the TD exit event, utilizes a first key identifier (ID) corresponding to a first encryption key assigned to the TD to save a TD supervisor execution state and a user execution state of the TD into a TD-TCS corresponding to the TD. In one implementation, the execution state is encrypted with the first encryption key, wherein the TDCS is access-controlled against software accesses from at least one of the TDRM, a VMM, or other TDs executed by the processing device.

Subsequently, at block 530, the processing logic modifies a key ID state of the processing device from the first key ID to a second key ID corresponding to the at least one of the TDRM or the VMM. Lastly, at block 540, the processing logic loads a TDRM execution and control state and exit information of the TDRM to cause the processing device to operating in a context of the TDRM.

FIG. 6 is a flow diagram of an example method 600 for performing a TD enter when providing isolation in virtualized systems using TDs, according to one implementation. Method 600 may be performed by processing logic that may comprise hardware (e.g., circuitry, dedicated logic, programmable logic, microcode, etc.), software (such as operations being performed by the MCU), firmware or a combination thereof. In one implementation, method 600 is performed by processing device 112 of FIG. 1A or FIG. 1B. In another implementation, the method 600 is performed by any of the processing devices described with respect to FIGS. 7-12. Alternatively, other components of the computing system 100 (or software executing on the processing device 112) may perform some or all of the operations of the method 600.

Referring to FIG. 6, the method 600 begins at block 610 when the processing logic identifies a TD enter event while executing in a context of a TDRM. In one implementation, the processing logic executes that TDRM to manage a TD.

At block 620, the processing logic, responsive to identifying the TD enter event, utilizes a first key ID corresponding to a first encryption key assigned to the TDRM to load a TDRM control state of the TDRM from a TDRCS corresponding to the TDRM. In one implementation, the execution state is encrypted with the first encryption key. Furthermore, the TDRCS may be access-controlled against software accesses from at least one of the TD or other TDs executed by the processing device.

Subsequently, at block 630, the processing logic modifies a key ID state of the processing device from the first key ID to a second key ID corresponding to a second encryption key assigned to the TD. Lastly, at block 640, the processing logic loads a TD user execution state and supervisor execution state of the TD from a TD-TCS to cause the processing device to operate in a context of the TD. In one implementation, the TD-TCS is access-controlled against software accesses from at least one of the TDRM or the other TDs executed by the processing device.

Figure 7A:
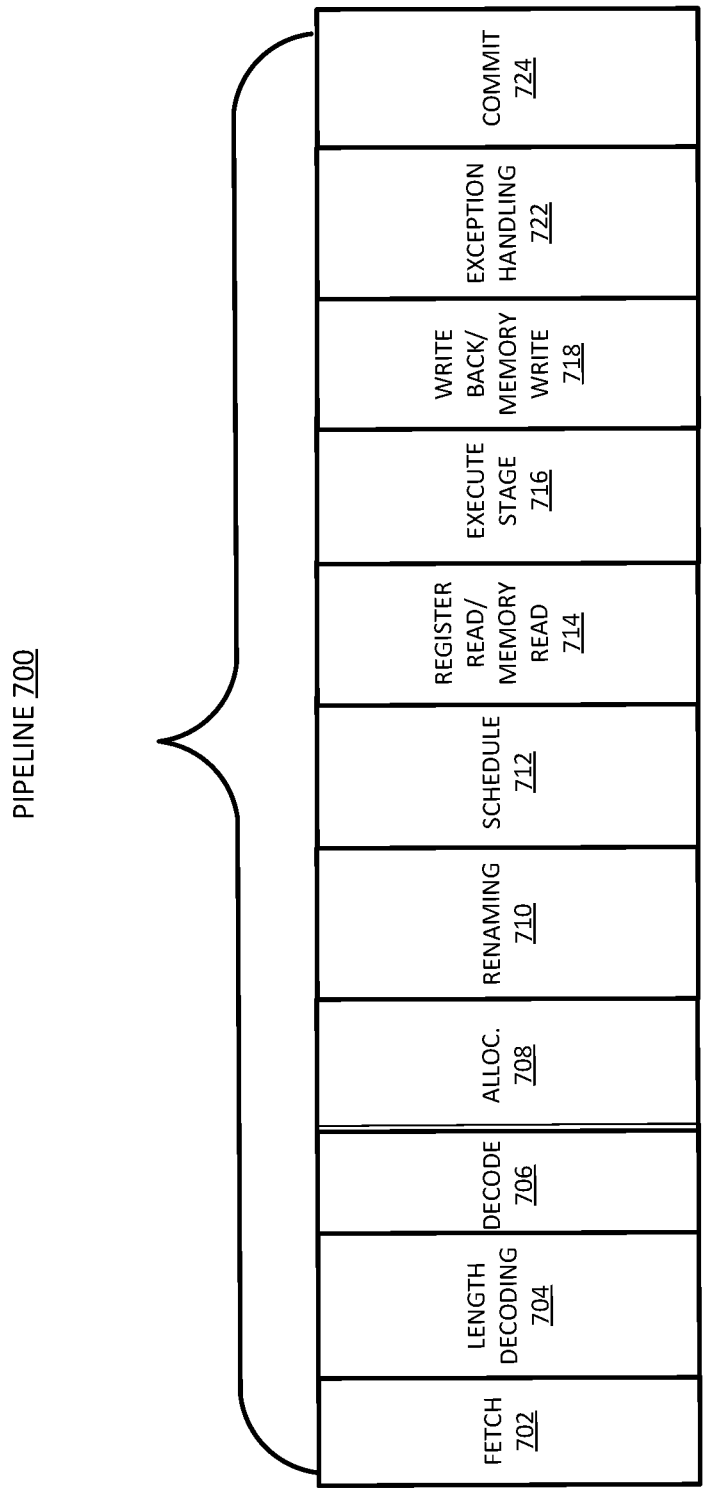
FIG. 7A is a block diagram illustrating a micro-architecture for a processor in which one implementation of the disclosure may be used.
Figure 7B:
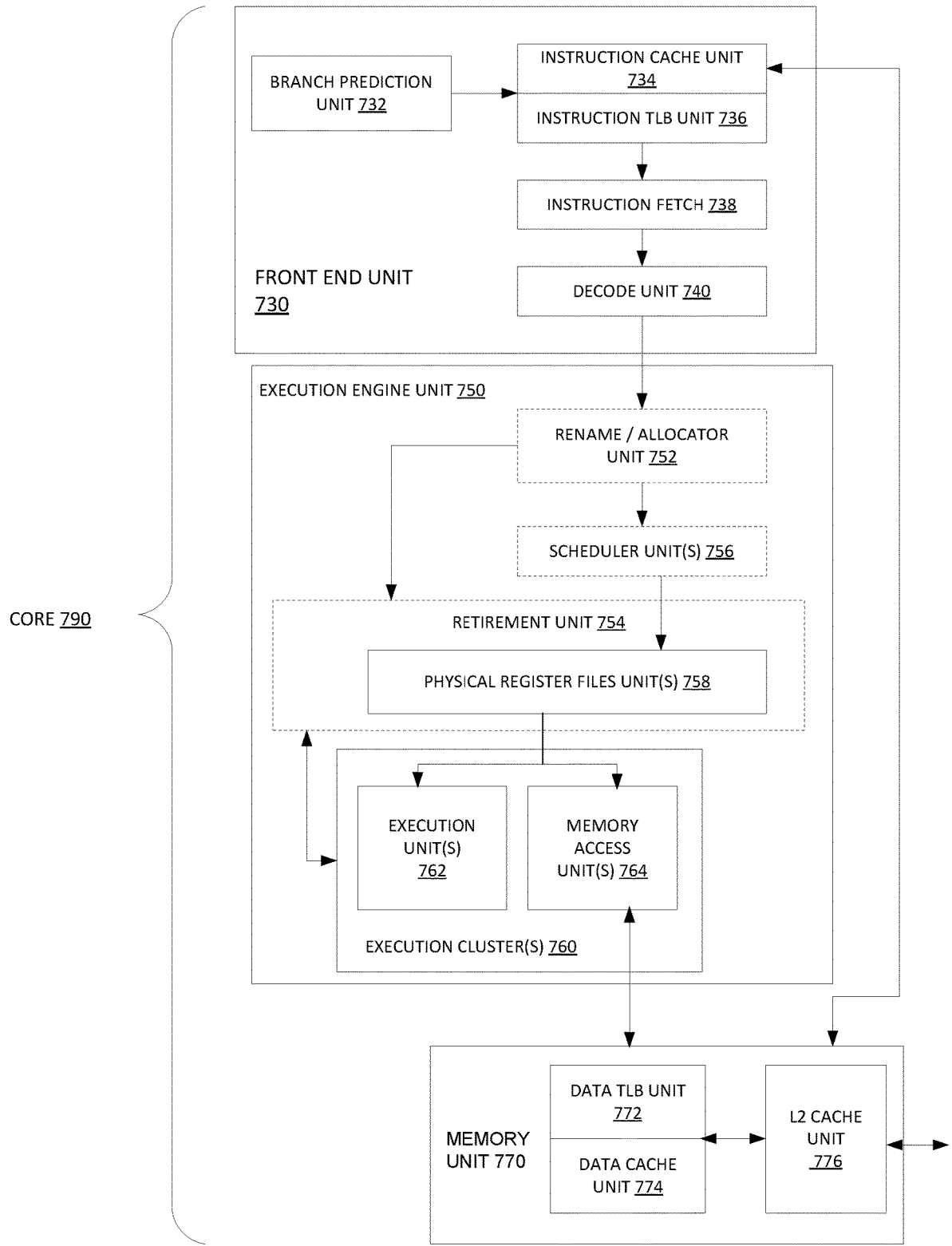
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register re-naming stage, out-of-order issue/execution pipeline of a processor monitoring performance of a processing device to provide isolation in virtualized systems using trust domains according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic.

In FIG. 7A, a processor pipeline 700 includes a fetch stage 702, a length decode stage 704, a decode stage 706, an allocation stage 708, a renaming stage 710, a scheduling (also known as a dispatch or issue) schedule stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 756, physical register file(s) unit(s) 758, and execution cluster(s) 760 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary implementation, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 740 performs the decode stage 706; 3) the rename/allocator unit 752 performs the allocation stage 708 and renaming stage 710; 4) the scheduler unit(s) 756 performs the schedule stage 712;

5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 734/774 and a shared L2 cache unit 776, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
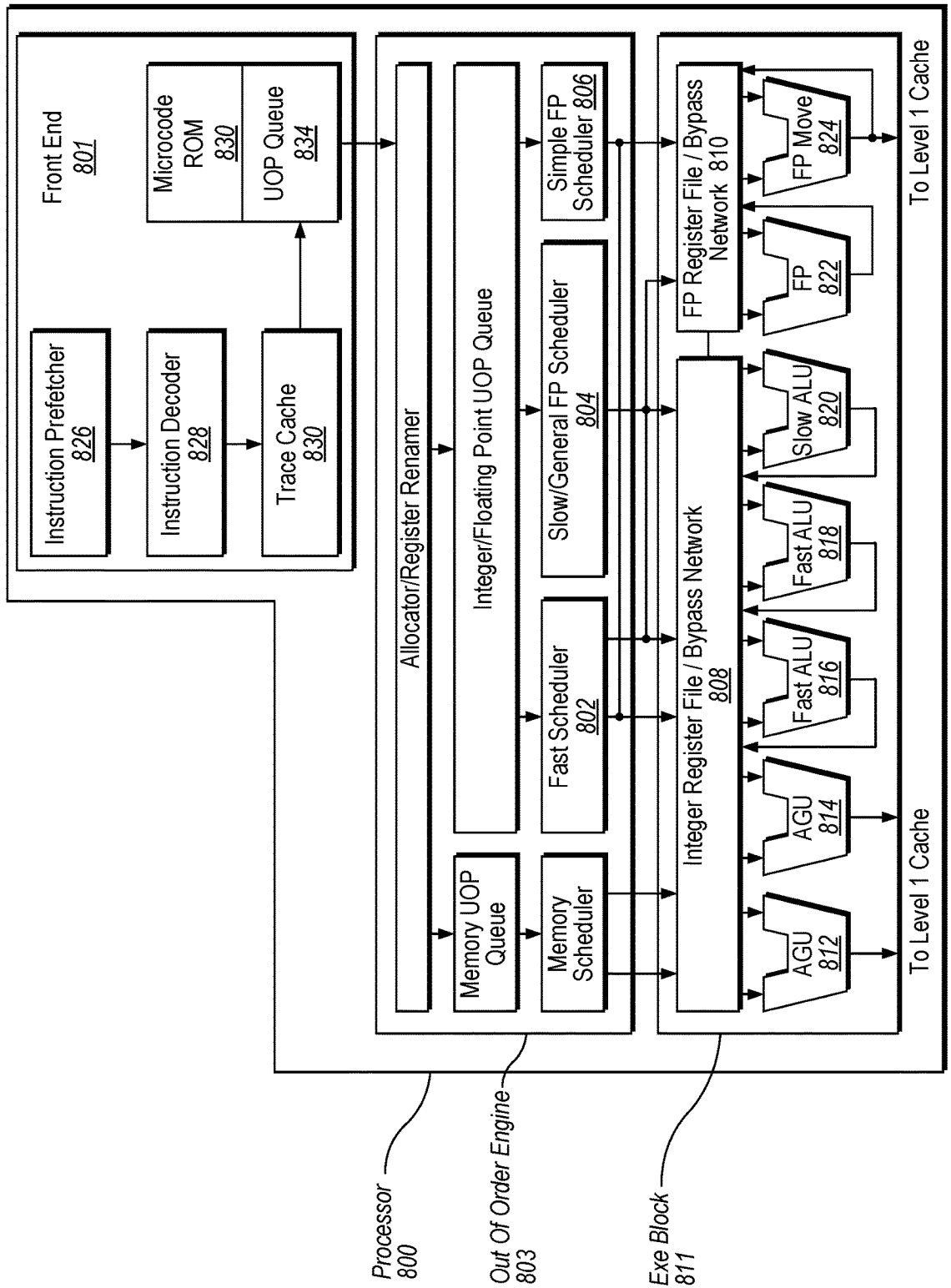
FIG. 8 illustrates a block diagram of the micro-architecture for a processing device that includes logic circuits to provide isolation in virtualized systems using trust domains according to one implementation.

FIG. 8 illustrates a block diagram of the micro-architecture for a processing device 800 that includes logic circuits to provide isolation in virtualized systems using trust domains according to one implementation. In some implementations, an instruction can be implemented to operate on data elements having sizes of byte, word, doubleword, quadword, etc., as well as datatypes, such as single and double precision integer and floating point datatypes. In one implementation the in-order front end 801 is the part of the processing device 800 that fetches instructions to be executed and prepares them to be used later in the processing device pipeline. The implementations of providing isolation in virtualized systems using trust domains can be implemented in processing device 800.

The front end 801 may include several units. In one implementation, the instruction prefetcher 816 fetches instructions from memory and feeds them to an instruction decoder 818 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction can be decoded into a small number of micro ops for processing at the instruction decoder 818. In another implementation, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation can schedule on each half of the main clock cycle while the other schedulers can only schedule once per main processing device clock cycle. The schedulers arbitrate for the dispatch ports to schedule uops for execution.

Register files 808, 810, sit between the schedulers 802, 804, 806, and the execution units 812, 814, 816, 818, 810, 812, 814 in the execution block 811. There is a separate register file 808, 810, for integer and floating point operations, respectively. Each register file 808, 810, of one implementation also includes a bypass network that can bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 810, 812, 814, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 810, floating point ALU 812, floating point move unit 814. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation can execute fast operations with an effective latency of half a clock cycle. For one implementation, most complex integer operations go to the slow ALU 810 as the slow ALU 810 includes integer execution hardware for long latency type of operations, such as a multiplier, shifts, flag logic, and branch processing. Memory load/store operations are executed by the AGUs 812, 814. For one implementation, the integer ALUs 816, 818, 810, are described in the context of performing integer operations on 64 bit data operands. In alternative implementations, the ALUs 816, 818, 810, can be implemented to support a variety of data bits including 16, 32, 128, 256, etc. Similarly, the floating point units 812, 814, can be implemented to support a range of operands having bits of various widths. For one implementation, the floating point units 812, 814, can operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 800 also includes logic to provide isolation in virtualized systems using trust domains according to one implementation. In one implementation, the execution block 811 of processing device 800 may include TDRM 180, MOT 160, TDCS 124, and TDTCS 128 to provide isolation in virtualized systems using trust domains, according to the description herein.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
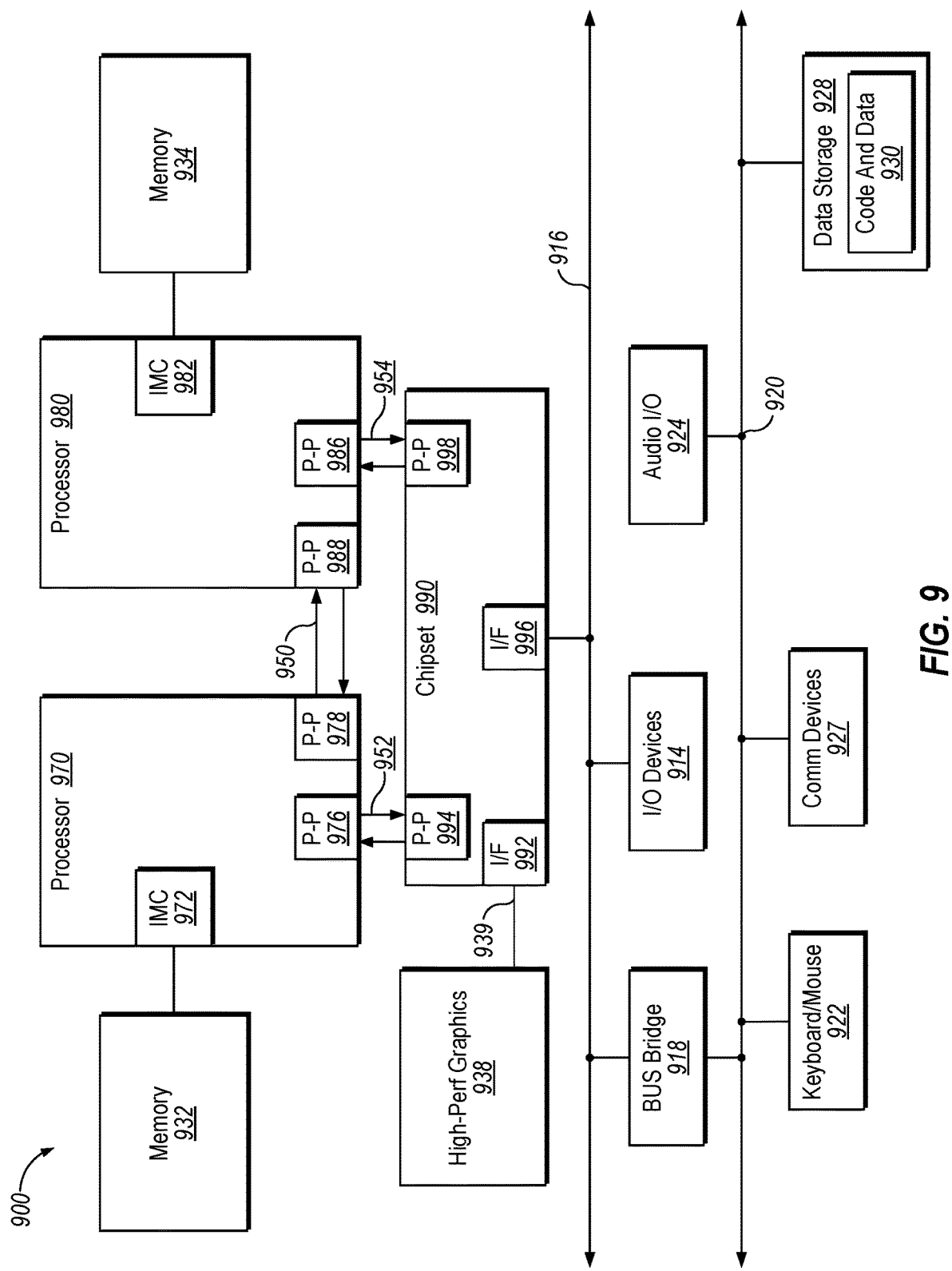
FIG. 9 is a block diagram of a computer system according to one implementation.

Implementations may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of the providing isolation in virtualized systems using trust domains can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
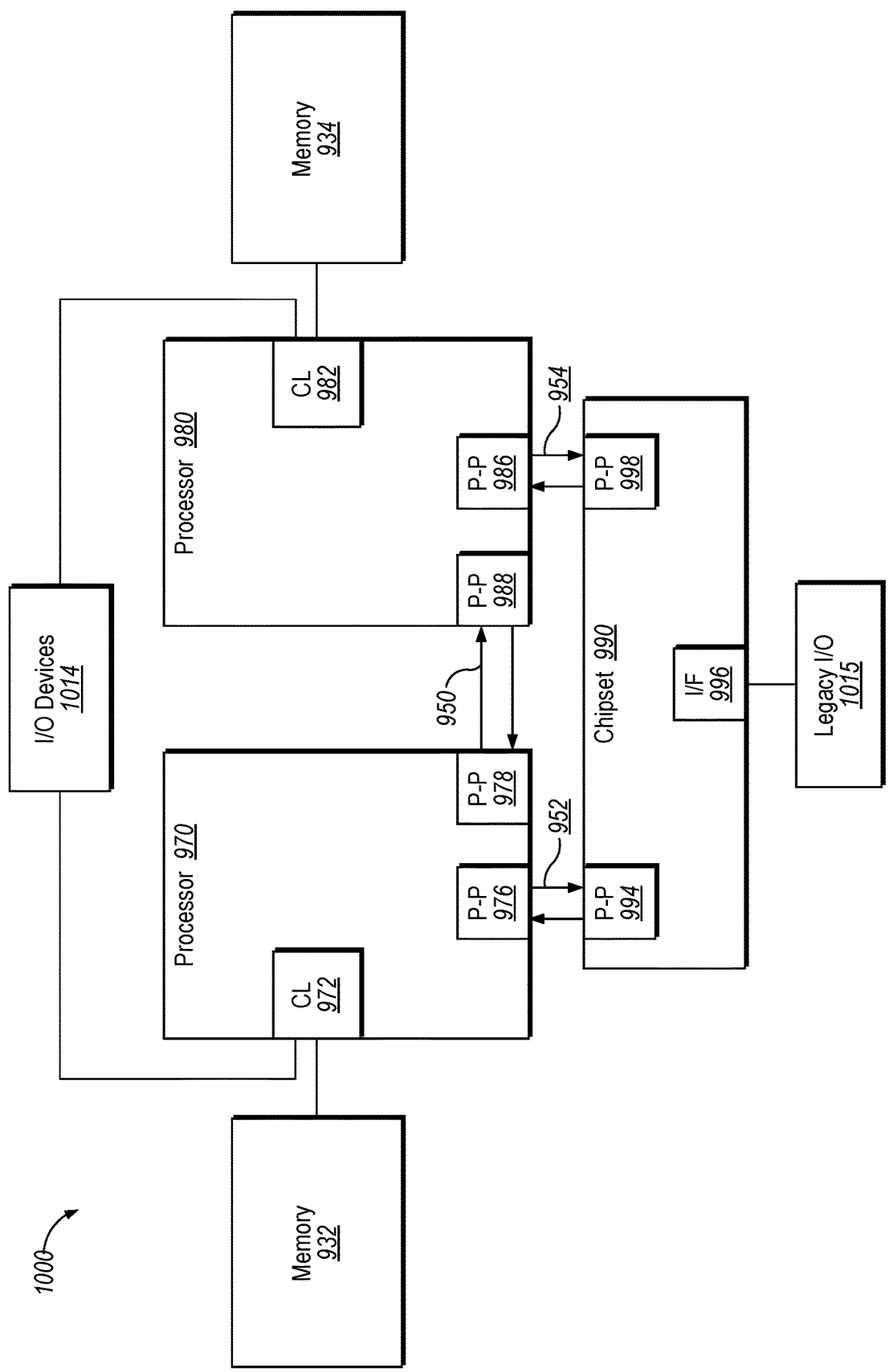
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing devices 970, 980 may include integrated memory and I/O control logic ("CL") 972 and 982, respectively. For at least one implementation, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 1014 are also coupled to the control logic 972, 982. Legacy I/O devices 1015 are coupled to the chipset 990. The implementations of the providing isolation in virtualized systems using trust domains can be implemented in processing device 970, processing device 980, or both.

Figure 11:
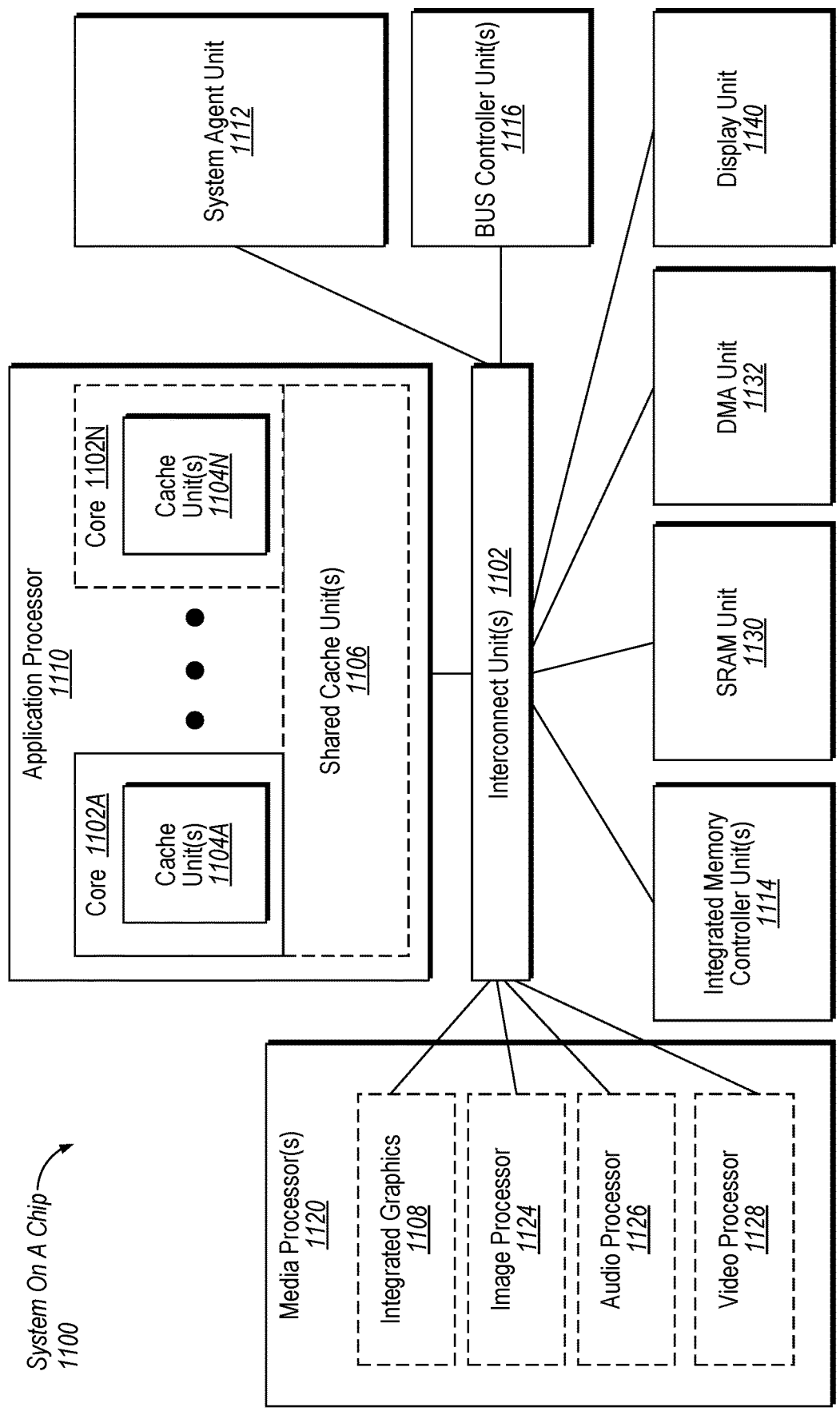
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of the providing isolation in virtualized systems using trust domains can be implemented in SoC 1100.

Figure 12:
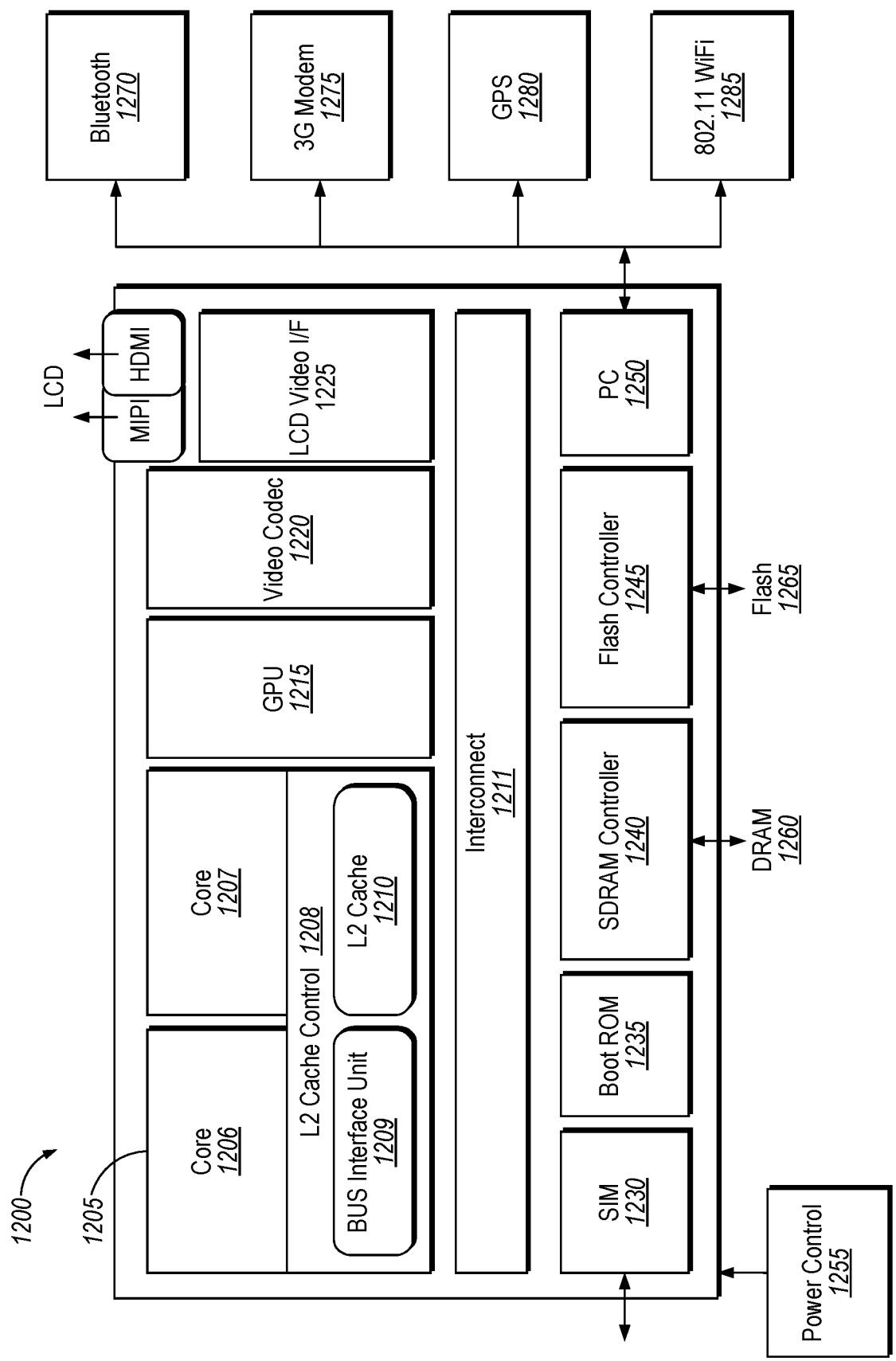
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the providing isolation in virtualized systems using trust domains can be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
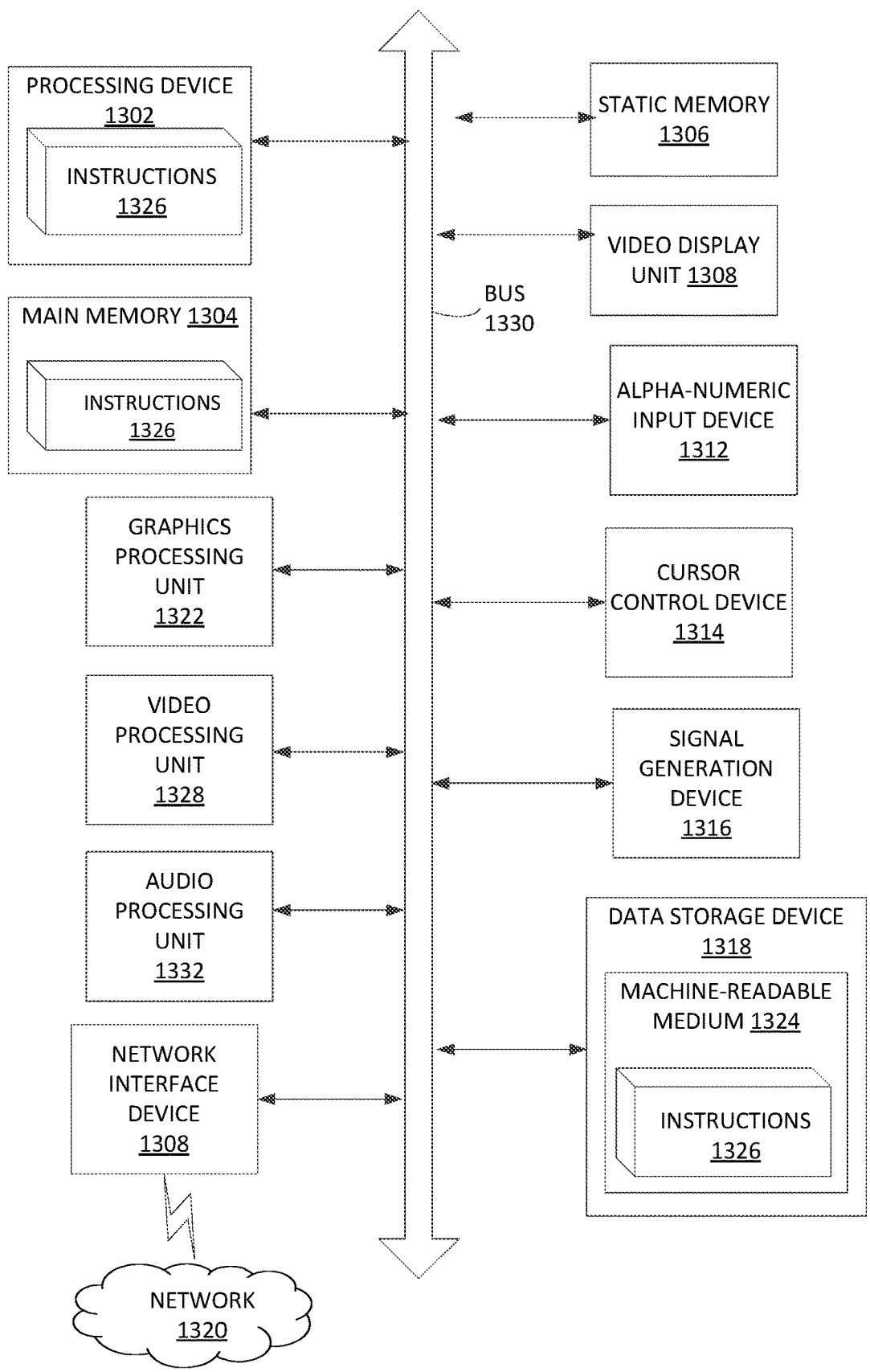
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute the processing logic 1326 for performing the operations discussed herein. In one implementation, processing device 1302 can be part of the computing system 100 of FIG. 1. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations. Example 1 is a processing device for providing isolation in virtualized systems using trust domains. Further to Example 1, a processing device comprises a memory ownership table (MOT) that is access-controlled against software access; and a processing core. Further to Example 1, the processing core is to: execute a trust domain (TD) and a trust domain resource manager (TDRM) to manage the TD; maintain a trust domain control structure (TDCS) for managing global metadata of one or more of the TD or other TDs executed by the processing device; maintain an execution state of the TD in one or more trust domain thread control structure (TD-TCS) that is referenced by the TDCS and is access-controlled against software access from at least one of the TDRM, a virtual machine manager (VMM), or the other TDs; reference the MOT to obtain at least one key identifier (ID) corresponding to an encryption key assigned to the TD, the key ID to allow the processing device to decrypt memory pages assigned to the TD responsive to the processing device executing in the context of the TD, the memory pages assigned to the TD encrypted with the encryption key; and reference the MOT to obtain a guest physical address corresponding to a host physical memory page assigned to the TD, wherein a match of the guest physical address obtained from the MOT with an accessed guest physical address is to allow the processing device access to the memory pages assigned to the TD responsive to the processing device executing in the context of the TD.

In Example 2, the subject matter of Example 1 can optionally include wherein the VMM comprises a TDRM component to provide memory management for at least one of the TD, the other TDs, or one or more virtual machines (VMs) via Extended Page Tables (EPTs). In Example 3, the subject matter of any one of Examples 1-2 can optionally include wherein the TD-TCS references the TDCS, wherein the TDCS to maintain a count of one or more TD-TCSs corresponding to a logical processor of the TD, and wherein the TD-TCS to store a supervisor execution state and a user execution state of the TD. In Example 4, the subject matter of any one of Examples 1-3 can optionally include wherein the encryption key is generated by a multi-key total memory encryption (MK-TME) engine of the processing device.

In Example 5, the subject matter of any one of Examples 1-4 can optionally include wherein the MK-TME engine generates a plurality of encryption keys accessed via key IDs assigned to the TD for use in encrypting and decrypting the memory pages of the TD, and encrypting and decrypting memory pages corresponding to persistent memory assigned to the TD, and wherein the MOT to track the plurality of key IDs via one key ID associated with each entry in the MOT. In Example 6, the subject matter of any one of Examples 1-5 can optionally include wherein the processing core to reference the MOT for host physical memory pages accessed as part of page walk operations to access a guest physical memory page mapped by the EPTs. In Example 7, the subject matter of any one of Examples 1-6 can optionally include wherein the TD comprises at least one of an operating system (OS) to manage one or more applications or the VMM to manage one or more virtual machines (VMs), and wherein a TD enter operation to transition an operating context of the processing core from at least one of the VMM to the OS of the TD or from the TDRM to the VMM of the TD.

In Example 8, the subject matter of any one of Examples 1-7 can optionally include wherein the TDRM is not comprised in a trusted computing base (TCB) of the TD. In Example 9, the subject matter of any one of Examples 1-8 can optionally include wherein the TDCS comprises a signature structure that captures a cryptographic measurement of the TD, the cryptographic measurement signed by a hardware root of trust of the processing device, and wherein the signature structure is provided to an attestation party for verification of the cryptographic measurement.

In Example 10, the subject matter of any one of Examples 1-9 can optionally include wherein the processing core is further to maintain measurement state of the TD in the TDCS that is access-controlled against software accesses from software comprising at least the TDRM, the VMM, or the other TDs executed by the processing device. In Example 11, the subject matter of any one of Examples 1-10 can optionally include wherein the TDRM manages the TD and the other TDs. All optional features of the apparatus described above may also be implemented with respect to the method or process described herein.

Example 12 is a method for providing isolation in virtualized systems using trust domains comprising identifying, by a processing device executing a trust domain resource manager (TDRM) to manage a trust domain (TD) executing on the processing device, a TD exit event; responsive to identifying the TD exit event, utilizing a first key identifier (ID) corresponding to a first encryption key assigned to the TD to save a TD supervisor execution state and a user execution state of the TD into a trust domain thread control structure (TD-TCS) corresponding to a logical processor assigned to the TD, the execution state encrypted with the first encryption key, wherein the TD-TCS is access-controlled against software accesses from at least one of the TDRM, a virtual machine manager (VMM), or other TDs executed by the processing device; modifying a key ID state of the processing device from the first key ID to a second key ID corresponding to at least one of the TDRM or the VMM; and loading a TDRM execution and control state and exit information for the TDRM to cause the processing device to operate in a context of the TDRM.

In Example 13, the subject matter of Example 12 can optionally include executing, in the context of the TDRM, a TD enter event; utilizing a second key identifier (ID) corresponding to a second encryption key assigned to the TDRM to load TDRM execution controls specified by the TDRM from a trust domain resource-manager control structure (TD-RCS) corresponding to the logical processor assigned to the TD, the execution state encrypted with the second encryption key, wherein the TD-RCS is access-controlled using the Extended Page Tables (EPTs) from at least one of the TD or other VMs executed by the processing device; modifying a key ID state of the processing device from the second key ID to a first key ID corresponding to the TD; and loading the user execution state and the supervisor execution state from the TD-TCS to cause the processing device to operate in a context of the TD. In Example 14, the subject matter of any one of Examples 12-13 can optionally include wherein the TDCS and TD-TCS are confidentiality-protected and access-controlled via a memory ownership table (MOT) of the processing device, the MOT comprising a first entry for the TDCS associating the first key ID to the TD, wherein the MOT utilizes the first key ID to enforce memory confidentiality for memory accesses to memory pages corresponding to the TD.

In Example 15, the subject matter of any one of Examples 12-14 can optionally include wherein the MOT is access-controlled via a range register. In Example 16, the subject matter of any one of Examples 12-15 can optionally include wherein the TDRM execution and control state is loaded from the TD-RCS structure that is access-controlled via the EPTs and the MOT, wherein the MOT comprises a second entry for the TD-RCS structure associating the second key ID with a physical memory page containing the TD-RCS, and wherein the MOT utilizes the second key ID to enforce memory confidentiality for memory accesses to memory pages corresponding to the TDRM. In Example 17, the subject matter of any one of Examples 12-16 can optionally include wherein the VMM is a root VMM that comprises the TDRM to manage one or more TDs, wherein the TD comprises a non-root VMM to manage one or more virtual machines (VMs), and wherein the TD exit to transition an operating context of the processing core from the non-root VMM or the one or more VMs of the TD to the root VMM and TDRM.

In Example 18, the subject matter of any one of Examples 12-17 can optionally include wherein the encryption key is generated by a multi-key total memory encryption (MK-TME) engine of the processing device, and wherein the MK-TME engine generates a plurality of encryption keys assigned to the TD via key IDs for use in encrypting ephemeral memory pages or persistent memory pages of the TD, and wherein the MOT tracks the plurality of encryption key IDs, with one key id per host physical page referenced in the MOT.

Example 19 is a system for providing isolation in virtualized systems using trust domains. In Example 19, the system includes a memory device to store instructions, and a processing device operably coupled to the memory device. Further to Example 19, the processing device to execute the instructions to: execute a trust domain resource manager (TDRM) to manage a trust domain (TD), wherein the TDRM is not comprised in a trusted computing base (TCB) of the TD; maintain a user execution state and a supervisor execution state of the TD in a trust domain thread control structure (TD-TCS) that is access-controlled against software accesses from at least one of the TDRM, a virtual machine manager (VMM), or other TDs executed by the processing device; and reference the MOT to obtain at least one encryption key identifier (ID) corresponding to an encryption key assigned to the TD, the key ID to allow the processing device to decrpyt memory pages assigned to the TD responsive to the processing device executing in the context of the TD, the memory pages assigned to the TD encrypted with the encryption key identified via the encryption key ID; and reference the MOT to obtain a guest physical address corresponding to a host physical memory page assigned to the TD, wherein a match of the guest physical address with an accessed guest physical address is to allow the processing device access to memory pages assigned to the TD responsive to the processing device executing in the context of the TD.

In Example 20, the subject matter of Example 19 can optionally include wherein the VMM comprises a TDRM component to provide memory management for one or more of the TD, the other TDs, or one or more virtual machines (VMs) via Extended Page Tables (EPTs). In Example 21, the subject matter of any one of Examples 19-20 can optionally include wherein the TD-TCS corresponds to a logical processor of the TD, the TD-TCS to store the user execution state and the supervisor execution state of the TD on a TD exit operation and load user and supervisor execution state of the TD on a TD enter operation, wherein the TD-TCS is access-controlled against software accesses from at least one of the TDRM, the VMM, or the other TDs executed by the processing device. In Example 22, the subject matter of any one of Examples 19-21 can optionally include wherein the encryption key is generated by a multi-key total memory encryption (MK-TME) engine of the processing device, and wherein the MK-TME engine generates a plurality of encryption keys assigned to the TD via key IDs for use in encrypting ephemeral memory pages or persistent memory pages of the TD, and wherein the MOT to track the plurality of encryption key IDs via one key ID associated with each entry in the MOT.

In Example 23, the subject matter of any one of Examples 19-22 can optionally include wherein the VMM comprises the TDRM to manage the TD, wherein the TD comprises an operating system (OS) or a non-root VMM to manage one or more virtual machines (VMs), and wherein a TD enter operation transitions an operating context of the processing core from the TDRM to the non-root VMM of the TD. All optional features of the system described above may also be implemented with respect to the method or process described herein.

Example 24 is a non-transitory computer-readable medium for providing isolation in virtualized systems using trust domains. In Example 24, the non-transitory machine-readable medium includes data that, when accessed by a processing device, cause the processing device to perform operations comprising identifying, by a processing device executing a trust domain resource manager (TDRM) to manage a trust domain (TD), a TD enter event while the processing device is executing in a context of the TDRM; responsive to identifying the TD enter event, utilizing a first key identifier (ID) corresponding to a first encryption key assigned to the TDRM to load a TDRM control state of the TDRM from a trust domain resource manager control structure (TDRCS) corresponding to the TDRM, the TDRM control state encrypted with the first encryption key, wherein the TDRCS is access-controlled against software accesses from at least one of the TD or other TDs executed by the processing device; modifying a key ID state of the processing device from the first key ID to a second key ID corresponding to a second encryption key assigned to the TD; and loading a TD user execution state and supervisor execution state of the TD from a trust domain thread control structure (TD-TCS) to cause the processing device to operate in a context of the TD, wherein the TD-TCS is access-controlled against software accesses from at least one of the TDRM or the other TDs executed by the processing device.

In Example 25, the subject matter of Example 24 can optionally include executing, in the context of the TDRM, a TD enter event; utilizing a second key identifier (ID) corresponding to a second encryption key assigned to the TDRM to load TDRM execution controls specified by the TDRM from a trust domain resource-manager control structure (TD-RCS) corresponding to the logical processor assigned to the TD, the execution state encrypted with the second encryption key, wherein the TD-RCS is access-controlled using the Extended Page Tables (EPTs) from at least one of the TD or other VMs executed by the processing device; modifying a key ID state of the processing device from the second key ID to a first key ID corresponding to the TD; and loading the user execution state and the supervisor execution state from the TD-TCS to cause the processing device to operate in a context of the TD.

In Example 26, the subject matter of Examples 30-31 can optionally include wherein the TDCS and TD-TCS are confidentiality-protected and access-controlled via a memory ownership table (MOT) of the processing device, the MOT comprising a first entry for the TDCS associating the first key ID to the TD, wherein the MOT utilizes the first key ID to enforce memory confidentiality for memory accesses to memory pages corresponding to the TD. In Example 27, the subject matter of Examples 30-32 can optionally include wherein the MOT is access-controlled via a range register.

In Example 28, the subject matter of Examples 30-33 can optionally include wherein the TDRM execution and control state is loaded from the TD-RCS structure that is access-controlled via the EPTs and the MOT, wherein the MOT comprises a second entry for the TD-RCS structure associating the second key ID with a physical memory page containing the TD-RCS, and wherein the MOT utilizes the second key ID to enforce memory confidentiality for memory accesses to memory pages corresponding to the TDRM.

In Example 29, the subject matter of Examples 30-34 can optionally include wherein the VMM is a root VMM that comprises the TDRM to manage one or more TDs, wherein the TD comprises a non-root VMM to manage one or more virtual machines (VMs), and wherein the TD exit to transition an operating context of the processing core from the non-root VMM or the one or more VMs of the TD to the root VMM and TDRM. In Example 30, the subject matter of Examples 30-35 can optionally include wherein the encryption key is generated by a multi-key total memory encryption (MK-TME) engine of the processing device, and wherein the MK-TME engine generates a plurality of encryption keys assigned to the TD via key IDs for use in encrypting ephemeral memory pages or persistent memory pages of the TD, and wherein the MOT tracks the plurality of encryption key IDs, with one key id per host physical page referenced in the MOT.

Example 31 is an apparatus for providing isolation in virtualized systems using trust domains comprising means for executing, by a processing device, a trust domain resource manager (TDRM) to manage a trust domain (TD), the TD executed by the processing device; means for maintaining a trust domain control structure (TDCS) for managing global metadata of one or more of the TD or other TDs executed by the processing device; means for maintaining an execution state of the TD in one or more trust domain thread control structure (TD-TCS) that is access-controlled against software access from at least one of the TDRM, a virtual machine manager (VMM), or the other TDs; means for referencing the MOT to obtain at least one key identifier (ID) corresponding to an encryption key assigned to the TD, the key ID to allow the processing device confidential access to memory pages assigned to the TD responsive to the processing device executing in the context of the TD, the memory pages assigned to the TD encrypted with the encryption key; and means for referencing the MOT to obtain a guest physical address corresponding to a host physical memory page assigned to the TD, wherein a match of the guest physical address obtained from the MOT with an accessed guest physical address is to allow the processing device access to the memory pages assigned to the TD responsive to the processing device executing in the context of the TD. In Example 32, the subject matter of Example 31 can optionally include the apparatus further configured to include the subject matter of any one of the Examples 2 to 11.

Example 33 is a system for providing isolation in virtualized systems using trust domains, comprising, the system comprising a memory device to store instructions and a processing core operably coupled to the memory device. Further to Example 33, the processing core is to: execute a trust domain resource manager (TDRM) to manage a trust domain (TD) executing on the processing device; identify a TD exit event; responsive to identifying the TD exit event, utilize a first key identifier (ID) corresponding to a first encryption key assigned to the TD to save a TD supervisor execution state and a user execution state of the TD into a trust domain thread control structure (TD-TCS) corresponding to a logical processor assigned to the TD, the execution state encrypted with the first encryption key, wherein the TD-TCS is access-controlled against software accesses from at least one of the TDRM, a virtual machine manager (VMM), or other TDs executed by the processing device; modify a key ID state of the processing device from the first key ID to a second key ID corresponding to at least one of the TDRM or the VMM; and load a TDRM execution and control state and exit information for the TDRM to cause the processing device to operate in a context of the TDRM. In Example 34, the subject matter of Example 33 can optionally include the subject matter of any one of Examples 13-18.

Example 35 is an apparatus for implementing providing isolation in virtualized systems using trust domains comprising a memory and a processing device coupled to the memory, wherein the processing device is to perform the method of any of Examples 12-18. Example 36 is an apparatus for implementing providing isolation in virtualized systems using trust domains comprising means for performing the method of any one of Examples 12 to 18. Example 37 is at least one machine readable medium comprising a plurality of instructions that in response to being executed on a computing device, cause the computing device to carry out a method according to any one of Examples 12-18. Specifics in the Examples may be used anywhere in one or more embodiments.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing isolation in virtualized systems using trust domains in specific integrated circuits, such as in computing platforms or microprocessing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and can be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, embodiment, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
a memory ownership table (MOT) to store security attributes for a host physical memory page; and
a processing core that is to:
execute a trust domain resource manager (TDRM) to manage a trust domain (TD);
maintain a trust domain control structure (TDCS) for managing metadata of the TD, wherein the TDRM is to cause creation of the TD using an instruction, wherein the instruction specifies a region of physical memory for the TDCS as a parameter of the instruction, and wherein execution of the instruction generates an encryption key assigned to the TD and a key identifier (ID) and initializes a hash for a TD measurement in the TDCS, the key ID to be stored in the TDCS;
maintain an execution state of the TD in a trust domain thread control structure (TD-TCS) that is referenced by the TDCS and is access-controlled against software access from at least one of the TDRM, a virtual machine manager (VMM), or the other TDs; and
reference the MOT to obtain the key identifier (ID) corresponding to the encryption key assigned to the TD, the key ID to allow the processing device to decrypt memory pages assigned to the TD responsive to the processing device executing in the context of the TD, the memory pages assigned to the TD encrypted with the encryption key;
wherein the MOT security attributes comprise:
a TD identifier assigning the host physical memory page to the TD, and
an expected guest physical address used in the TD for the TDRM to perform memory mapping of the host physical memory page.

2. The processing device of claim 1, wherein the VMM comprises a TDRM component to provide memory management for at least one of the TD, the other TDs, or one or more virtual machines (VMs) via Extended Page Tables (EPTs).

3. The processing device of claim 1, wherein the TD-TCS references the TDCS, wherein the TDCS is to maintain a count of one or more TD-TCSs corresponding to a logical processor of the TD, and wherein the TD-TCS to store a supervisor execution state and a user execution state of the TD.

4. The processing device of claim 1, wherein the encryption key is generated by a multi-key total memory encryption (MK-TME) engine of the processing device.

5. The processing device of claim 4, wherein the MK-TME engine generates a plurality of encryption keys accessed via key IDs assigned to the TD for use in encrypting and decrypting the memory pages of the TD, and encrypting and decrypting memory pages corresponding to persistent memory assigned to the TD, and wherein the MOT to track the plurality of key IDs via one key ID associated with each entry in the MOT.

6. The processing device of claim 2, wherein the processing core to reference the MOT for host physical memory pages accessed as part of page walk operations to access a guest physical memory page mapped by the EPTs.

7. The processing device of claim 1, wherein the TD comprises at least one of an operating system (OS) to manage one or more applications or the VMM to manage one or more virtual machines (VMs), and wherein a TD enter operation to transition an operating context of the processing core from at least one of the VMM to the OS of the TD or from the TDRM to the VMM of the TD.

8. The processing device of claim 1, wherein the TDRM is not comprised in a trusted computing base (TCB) of the TD.

9. The processing device of claim 1, wherein the TDCS comprises a signature structure that captures a cryptographic measurement of the TD, the cryptographic measurement signed by a hardware root of trust of the processing device, and wherein the signature structure is provided to an attestation party for verification of the cryptographic measurement.

10. The processing device of claim 1, wherein the processing core is further to maintain measurement state of the TD in the TDCS that is access-controlled against software accesses from software comprising at least the TDRM, the VMM, or the other TDs executed by the processing device.

11. The processing device of claim 1, wherein the TDRM manages the TD and the other TDs.

12. A system comprising:
a memory device to store one or more instructions; and
a processing device operably coupled to the memory device, the processing device to execute the one or more instructions to:
execute a trust domain resource manager (TDRM) to manage a trust domain (TD), wherein the TDRM is not comprised in a trusted computing base (TCB) of the TD;
maintain a user execution state and a supervisor execution state of the TD in a trust domain thread control structure (TD-TCS) that is access-controlled against software accesses from at least one of the TDRM, a virtual machine manager (VMM), or other TDs executed by the processing device; and
reference a memory ownership table (MOT) to obtain at least one key identifier (ID) corresponding to an encryption key assigned to the TD, the key ID to allow the processing device to decrypt memory pages assigned to the TD responsive to the processing device executing in the context of the TD, the memory pages assigned to the TD encrypted with the encryption key identified via the key ID, wherein the MOT is to store security attributes for a host physical memory page assigned to the TD, wherein a trust domain control structure (TDCS) is to manage metadata of the TD, wherein the TDRM is to cause creation of the TD using an instruction, wherein the instruction specifies a region of physical memory for the TDCS as a parameter of the instruction, and wherein execution of the instruction generates the encryption key assigned to the TD and the key ID and initializes a hash for a TD measurement in the TDCS, the key ID to be stored in the TDCS;

wherein the MOT security attributes comprise:
a TD identifier assigning the host physical memory page to the TD, and
an expected guest physical address used in the TD for the TDRM to perform memory mapping of the host physical memory page.

13. The system of claim 12, wherein the VMM comprises a TDRM component to provide memory management for one or more of the TD, the other TDs, or one or more virtual machines (VMs) via Extended Page Tables (EPTs).

14. The system of claim 12, wherein the TD-TCS corresponds to a logical processor of the TD, the TD-TCS to store the user execution state and the supervisor execution state of the TD on a TD exit operation and load user and supervisor execution state of the TD on a TD enter operation, wherein the TD-TCS is access-controlled against software accesses from at least one of the TDRM, the VMM, or the other TDs executed by the processing device.

15. The system of claim 12, wherein the encryption key is generated by a multi-key total memory encryption (MK-TME) engine of the processing device, and wherein the MK-TME engine generates a plurality of encryption keys assigned to the TD via key IDs for use in encrypting ephemeral memory pages or persistent memory pages of the TD, and wherein the MOT to track the plurality of encryption key IDs via one key ID associated with each entry in the MOT.

16. The system of claim 12, wherein the VMM comprises the TDRM to manage the TD, wherein the TD comprises an operating system (OS) or a non-root VMM to manage one or more virtual machines (VMs), and wherein a TD enter operation transitions an operating context of the processing device from the TDRM to the non-root VMM of the TD.

17. A method comprising:
executing, by a processing device, a trust domain resource manager (TDRM) to manage a trust domain (TD), wherein the TDRM is not comprised in a trusted computing base (TCB) of the TD;
maintaining a user execution state and a supervisor execution state of the TD in a trust domain thread control structure (TD-TCS) that is access-controlled against software accesses from at least one of the TDRM, a virtual machine manager (VMM), or other TDs executed by the processing device; and
referencing a memory ownership table (MOT) to obtain at least one encryption key identifier (ID) corresponding to an encryption key assigned to the TD, the key ID to allow the processing device to decrypt memory pages assigned to the TD responsive to the processing device executing in the context of the TD, the memory pages assigned to the TD encrypted with the encryption key identified via the encryption key ID, wherein the MOT is to store security attributes for a host physical memory page assigned to the TD, wherein a trust domain control structure (TDCS) is to manage metadata of the TD, wherein the TDRM is to cause creation of the TD using an instruction, wherein the instruction specifies a region of physical memory for the TDCS as a parameter of the instruction, and wherein execution of the instruction generates the encryption key assigned to the TD and the key ID and initializes a hash for a TD measurement in the TDCS, the key ID to be stored in the TDCS;
wherein the MOT security attributes for the host physical memory page comprise:
a TD identifier assigning the host physical memory page to the TD, and
an expected guest physical address used in the TD for the TDRM to perform memory mapping of the host physical memory page.

18. The method of claim 17, wherein the VMM comprises a TDRM component to provide memory management for at least one of the TD, the other TDs, or one or more virtual machines (VMs) via Extended Page Tables (EPTs).

19. The method of claim 17, wherein the TD-TCS references the TDCS, wherein the TDCS to maintain a count of one or more TD-TCSs corresponding to a logical processor of the TD, and wherein the TD-TCS to store a supervisor execution state and a user execution state of the TD.

20. The method of claim 17, wherein the encryption key is generated by a multi-key total memory encryption (MK-TME) engine of the processing device.

21. The method of claim 20, wherein the MK-TME engine generates a plurality of encryption keys accessed via key IDs assigned to the TD for use in encrypting and decrypting the memory pages of the TD, and encrypting and decrypting memory pages corresponding to persistent memory assigned to the TD, and wherein the MOT to track the plurality of key IDs via one key ID associated with each entry in the MOT.

22. The method of claim 18, further comprising referencing the MOT for host physical memory pages accessed as part of page walk operations to access a guest physical memory page mapped by the EPTs.

23. The method of claim 17, wherein the TD comprises at least one of an operating system (OS) to manage one or more applications or the VMM to manage one or more virtual machines (VMs), and wherein a TD enter operation to transition an operating context of the processing device from at least one of the VMM to the OS of the TD or from the TDRM to the VMM of the TD.

24. The method of claim 17, wherein the TDRM is not comprised in a trusted computing base (TCB) of the TD.

25. The method of claim 17, wherein the TDCS comprises a signature structure that captures a cryptographic measurement of the TD, the cryptographic measurement signed by a hardware root of trust of the processing device, and wherein the signature structure is provided to an attestation party for verification of the cryptographic measurement.

26. The processing device of claim 1, wherein the TDCS is to maintain a count of how many TD-TCSs associated with the TDCS are currently busy.

27. The processing device of claim 1, wherein the TDCS is to indicate a maximum number of logic processors allowable to be assigned to the TD.

28. The processing device of claim 1, wherein the TDCS is to indicate whether the TD shares one encryption key with another TD.

29. The processing device of claim 1, wherein the TD-TCS is to maintain an execution state of one or more virtual processors of the TD.

* * * * *